(12) United States Patent
Beveridge et al.

(10) Patent No.: US 10,986,098 B2
(45) Date of Patent: Apr. 20, 2021

(54) REVERSE IDENTITY FEDERATION IN DISTRIBUTED CLOUD SYSTEMS

(71) Applicant: VMWARE, INC., Palo Alto, CA (US)

(72) Inventors: Daniel James Beveridge, Apollo Beach, FL (US); Anil Sharma, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 332 days.

(21) Appl. No.: 16/195,864

(22) Filed: Nov. 20, 2018

(65) Prior Publication Data

US 2020/0045050 A1 Feb. 6, 2020

(30) Foreign Application Priority Data

Jul. 31, 2018 (IN) .............................. 201841028747

(51) Int. Cl.
*H04L 29/06* (2006.01)
*G06F 9/50* (2006.01)
*H04L 29/08* (2006.01)

(52) U.S. Cl.
CPC .......... *H04L 63/102* (2013.01); *G06F 9/5077* (2013.01); *H04L 63/0281* (2013.01); *H04L 63/0815* (2013.01); *H04L 67/10* (2013.01); *G06F 2209/5011* (2013.01)

(58) Field of Classification Search
CPC ............... H04L 63/102; H04L 63/0281; H04L 63/0815
See application file for complete search history.

(56) References Cited

U.S. PATENT DOCUMENTS

| | | | | |
|---|---|---|---|---|
| 2012/0254957 | A1* | 10/2012 | Fork | H04L 63/0807 726/6 |
| 2014/0020078 | A1* | 1/2014 | Canning | H04L 63/0815 726/8 |
| 2014/0245389 | A1* | 8/2014 | Oberheide | H04L 63/0884 726/3 |
| 2014/0298419 | A1* | 10/2014 | Boubez | H04L 63/10 726/4 |
| 2016/0065579 | A1* | 3/2016 | Chen | H04L 63/10 726/4 |
| 2016/0134616 | A1* | 5/2016 | Koushik | H04L 63/08 726/9 |
| 2017/0331832 | A1* | 11/2017 | Lander | H04L 63/0807 |
| 2018/0324173 | A1* | 11/2018 | Ananthapur Bache | H04L 63/0815 |

* cited by examiner

*Primary Examiner* — Christopher C Harris

(57) ABSTRACT

The current document is directed to reverse federated identity-management systems and to reverse-federated-identity-management methods employed by the reverse federated identity-management systems. The currently disclosed reverse-federated-identity-management systems automatically provision local proxy identities in distributed computers systems from which distributed resource-distribution systems allocate resources on behalf of users and clients of the distributed resource-distribution systems. In addition, the currently disclosed reverse-federated-identity-management systems automatically record associations of local proxy identities with users and clients of the distributed resource-distribution systems so that the users can be subsequently identified to auditing and monitoring organizations should the need for detailed auditing and monitoring subsequently arise.

20 Claims, 36 Drawing Sheets

REVERSE IDENTITY FEDERATION IN DISTRIBUTED CLOUD SYSTEMS

RELATED APPLICATIONS

Benefit is claimed under 35 U.S.C. 119(a)-(d) to Foreign Application Serial No. 201841028747 filed in India entitled "REVERSE IDENTITY FEDERATION IN DISTRIBUTED CLOUD SYSTEMS", on Jul. 31, 2018, by VMware, Inc., which is herein incorporated in its entirety by reference for all purposes.

TECHNICAL FIELD

The current document is directed to distributed computing systems and, in particular, to methods and systems that automatically provision local proxy identities on behalf of users who access resources in remote distributed computer systems through distributed platform-providing and services-providing systems.

BACKGROUND

Computer systems and computational technologies have steadily evolved, during the past 70 years, from initial vacuum-tube-based systems that lacked operating systems, compilers, network connectivity, and most other common features of modern computing systems to vast distributed computing systems that include large numbers of multi-processor servers, data-storage appliances, and multiple layers of internal communications networks interconnected by various types of wide-area networks and that provide computational resources to hundreds, thousands, tens of thousands, or more remote users. As operating systems, and virtualization layers have been developed and refined, over the years, in parallel with the advancements in computer hardware and networking, the robust execution environments provided by distributed operating systems and virtualization layers now provide a foundation for development and evolution of many different types of distributed application programs, including distributed database-management systems, distributed client-server applications, and distributed web-based service-provision applications. This has resulted in a geometric increase in the complexity of distributed computing systems, as a result of which owners, administrators, and users of distributed computing systems and consumers of computational resources provided by distributed computing systems increasingly rely on automated and semi-automated management and computational-resource-distribution subsystems to organize the activities of many users and computational-resource consumers and to control access to, and use of, computational resources within distributed computing systems.

One problem domain that has emerged in the area of distributed computing systems concerns control over various computational resources, including virtual machines, processor-controlled hardware devices, network-attached data-storage devices, services provided through service-provision interfaces, and other such computational resources. Typically, access to computational resources has been controlled by authentication and authorization functionality provided by identity management systems within computer systems and distributed computer systems. As user access to multiple, separately managed, distributed computer systems has become more common, federated identity systems have been developed to provide distributed identity management across multiple data centers and systems. These federated identity-management systems are largely directed to linking separate local identities corresponding to a given user within each of multiple data centers and systems to allow a user to seamlessly access multiple data centers and systems without constantly supplying passwords, biometric data, and/or other information to satisfy local identity-based authentication and authorization requirements of the individual data centers and systems. However, as new, higher-level distributed systems that allocate computational resources from multiple distributed computer systems on behalf of clients and users of the higher-level distributed systems have begun to emerge, new classes of problems associated with user authorization and authentication have emerged that are not addressed by federated identity-management systems. As a result, designers, developers, and users of the new, higher-level distributed systems continue to seek new technologies to facilitate access, by users and clients of the new, higher-level distributed systems, to computational resources allocated on their behalf by the new, higher-level distributed systems from multiple, separately managed distributed computer systems.

SUMMARY

The current document is directed to reverse federated identity-management systems and to reverse-federated-identity-management methods employed by the reverse federated identity-management systems. The currently disclosed reverse-federated-identity-management systems automatically provision local proxy identities in distributed computers systems from which distributed resource-distribution systems allocate resources on behalf of users and clients of the distributed resource-distribution systems. In addition, the currently disclosed reverse-federated-identity-management systems automatically record associations of local proxy identities with users and clients of the distributed resource-distribution systems so that the users can be subsequently identified to auditing and monitoring organizations should the need for detailed auditing and monitoring subsequently arise.

DETAILED DESCRIPTION

Figure 1:
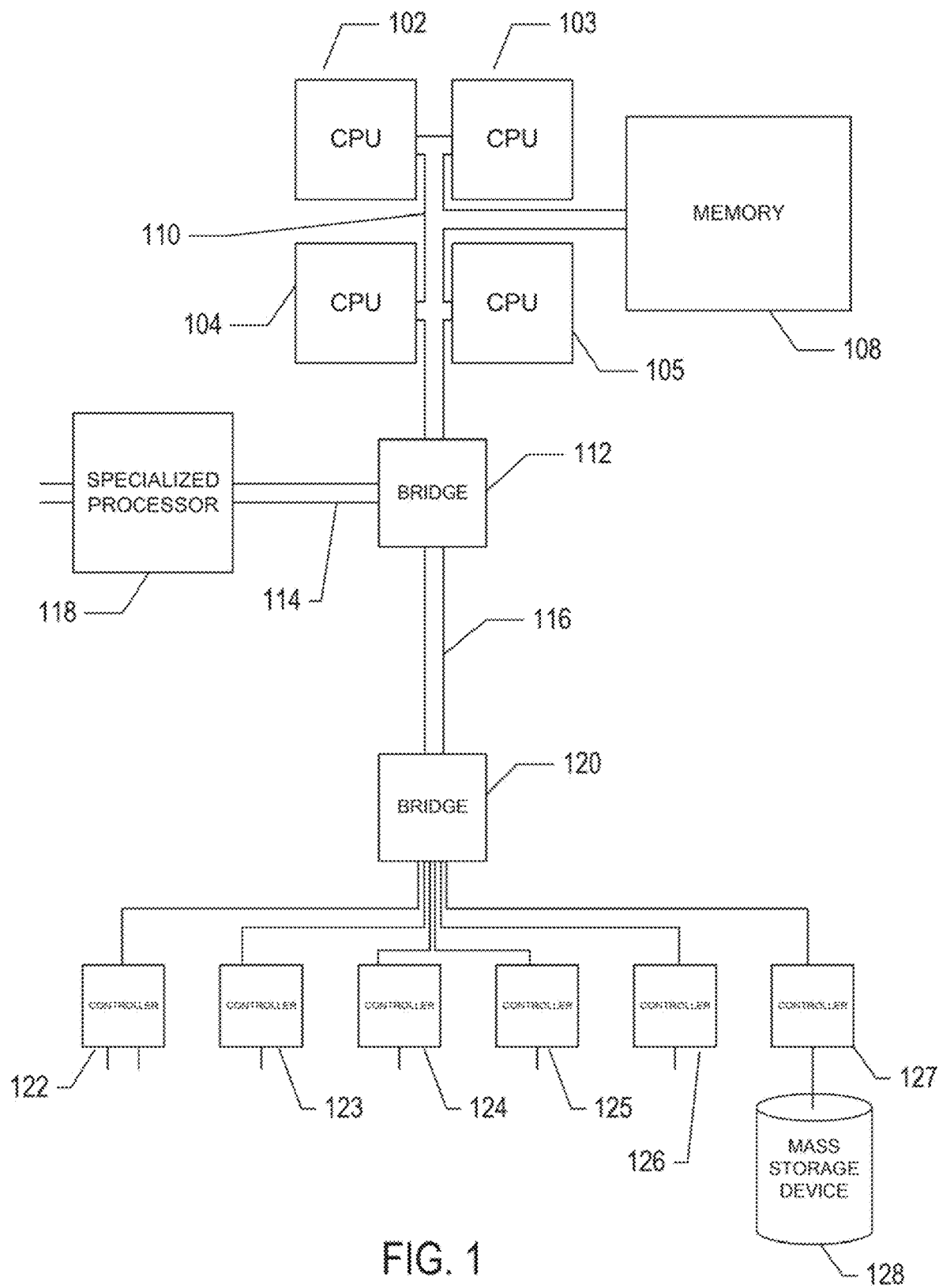
FIG. 1 provides a general architectural diagram for various types of computers.

The current document is directed to reverse federated identity-management systems and to reverse-federated-identity-management methods employed by the reverse federated identity-management systems. In a first subsection, below, a detailed description of computer hardware, complex computational systems, and virtualization is provided with reference to FIGS. 1-10. In a second subsection, the methods and systems to which the current document is directed are discussed with reference to FIGS. 11-18G.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
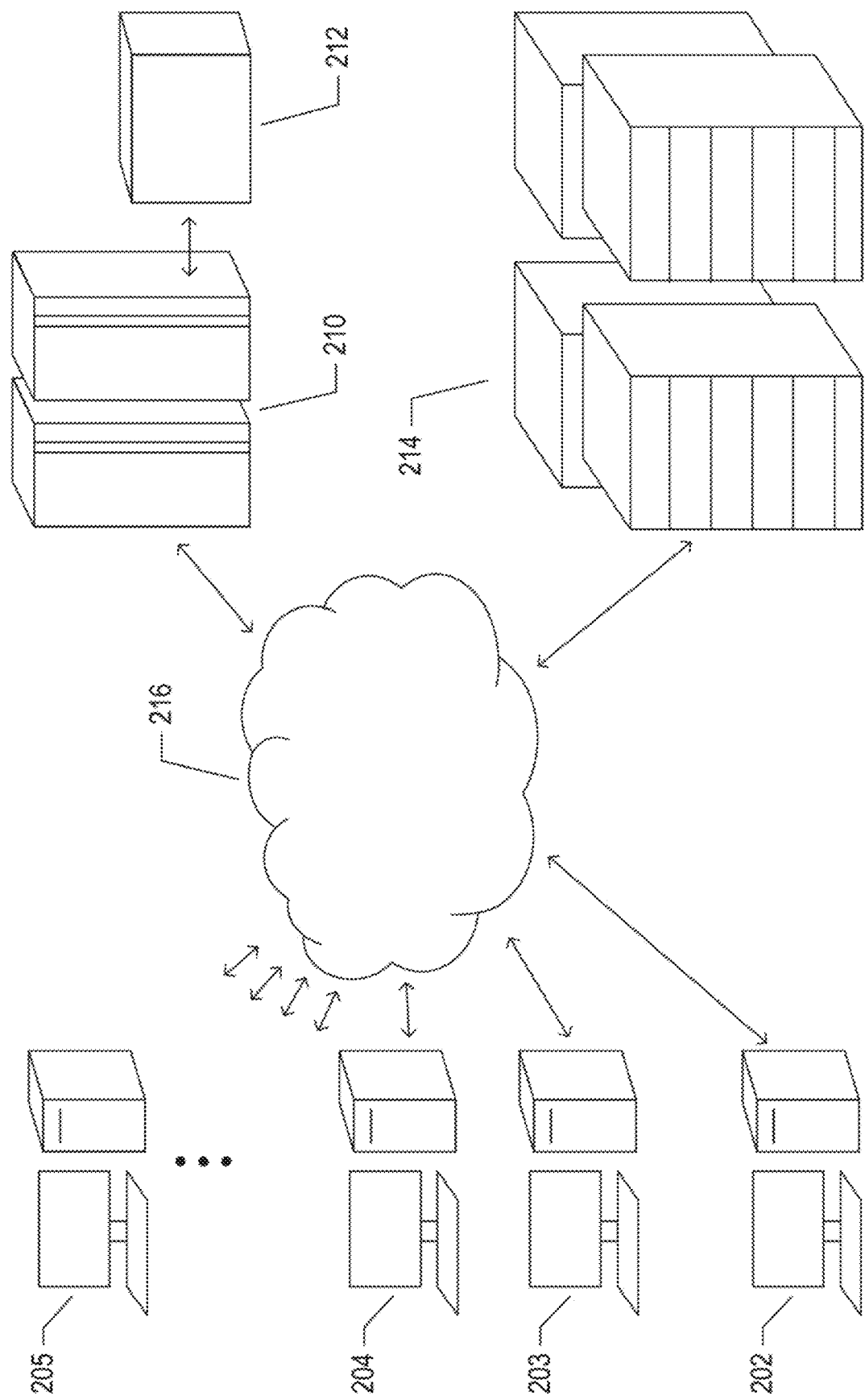
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
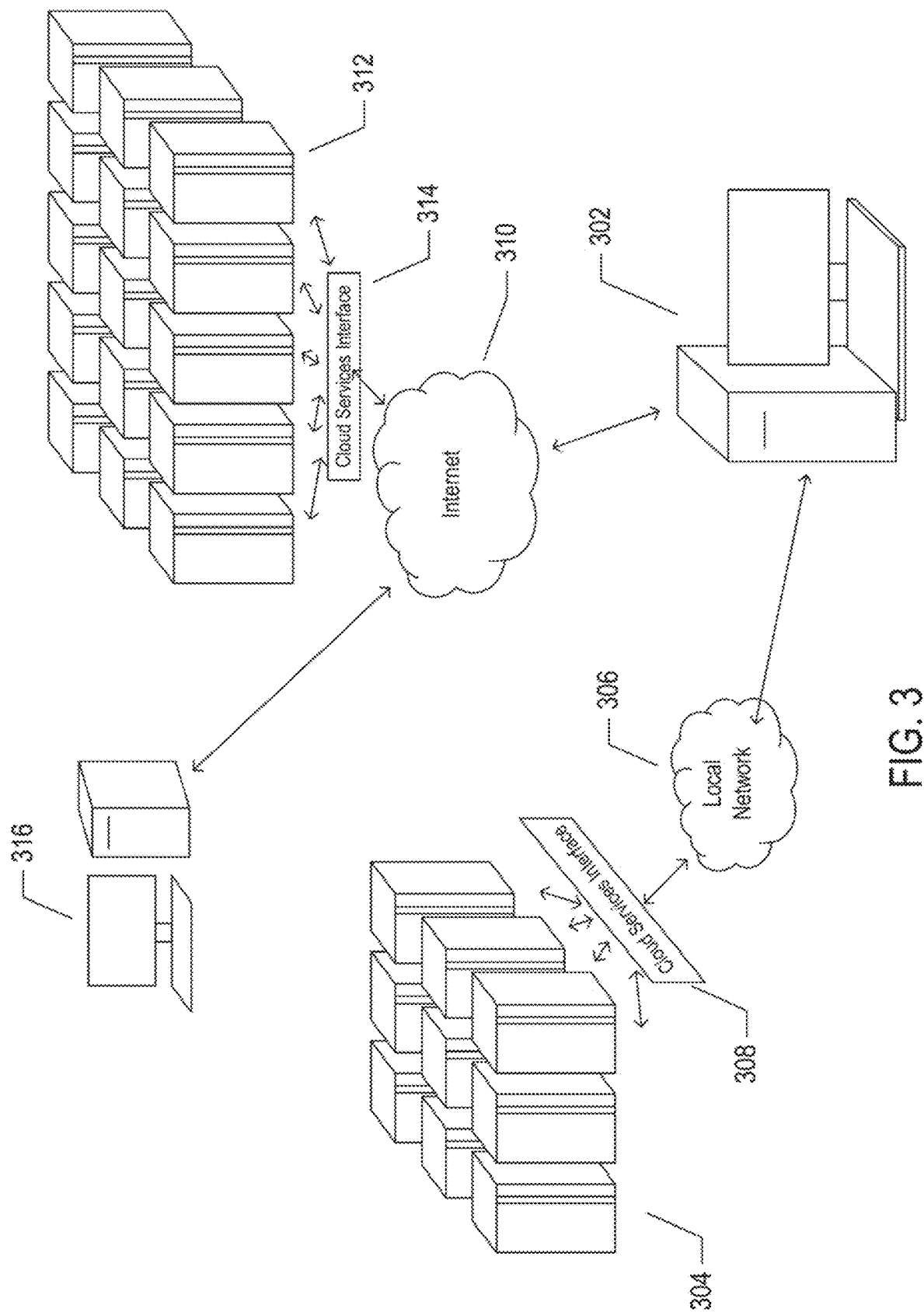
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
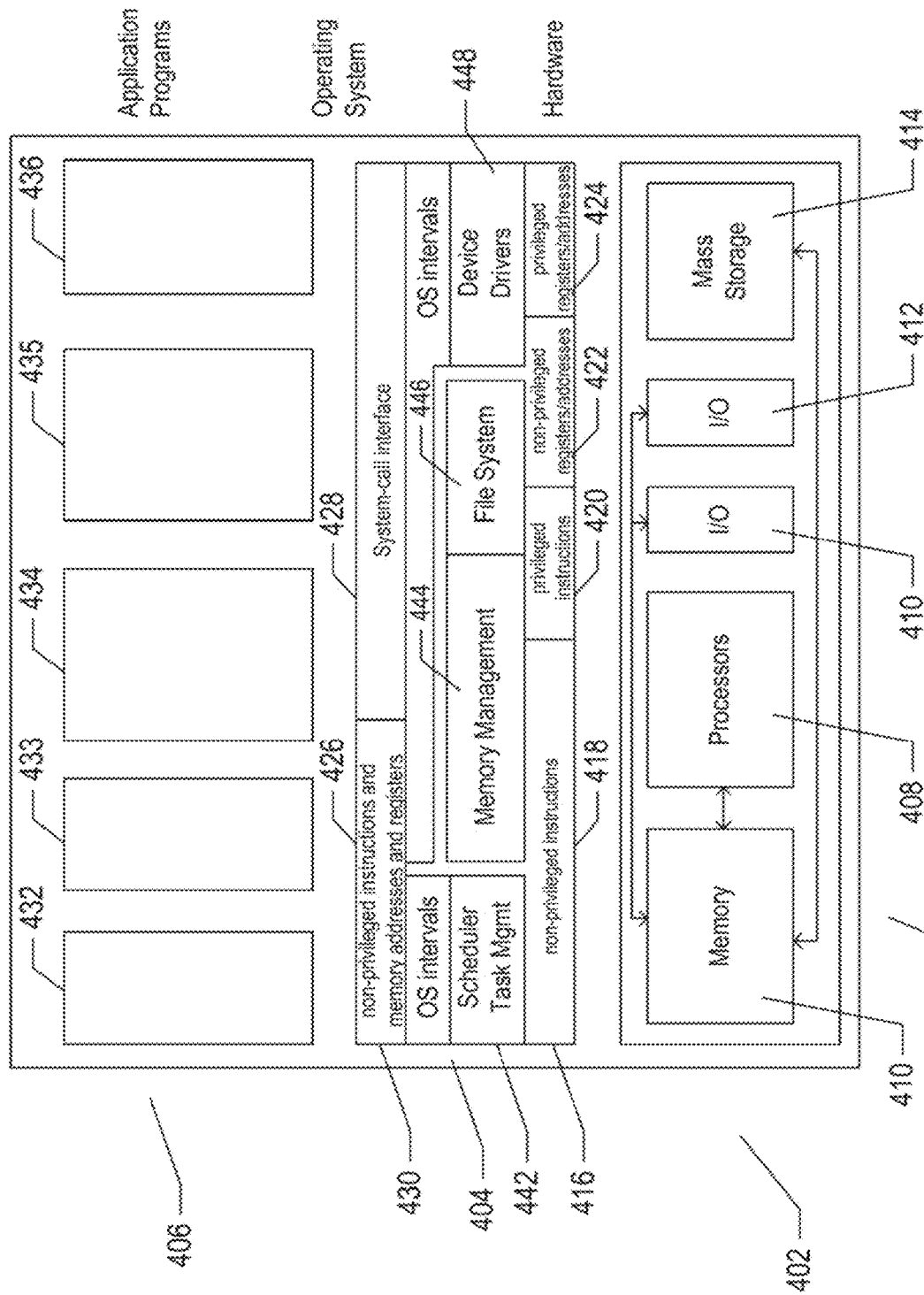
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
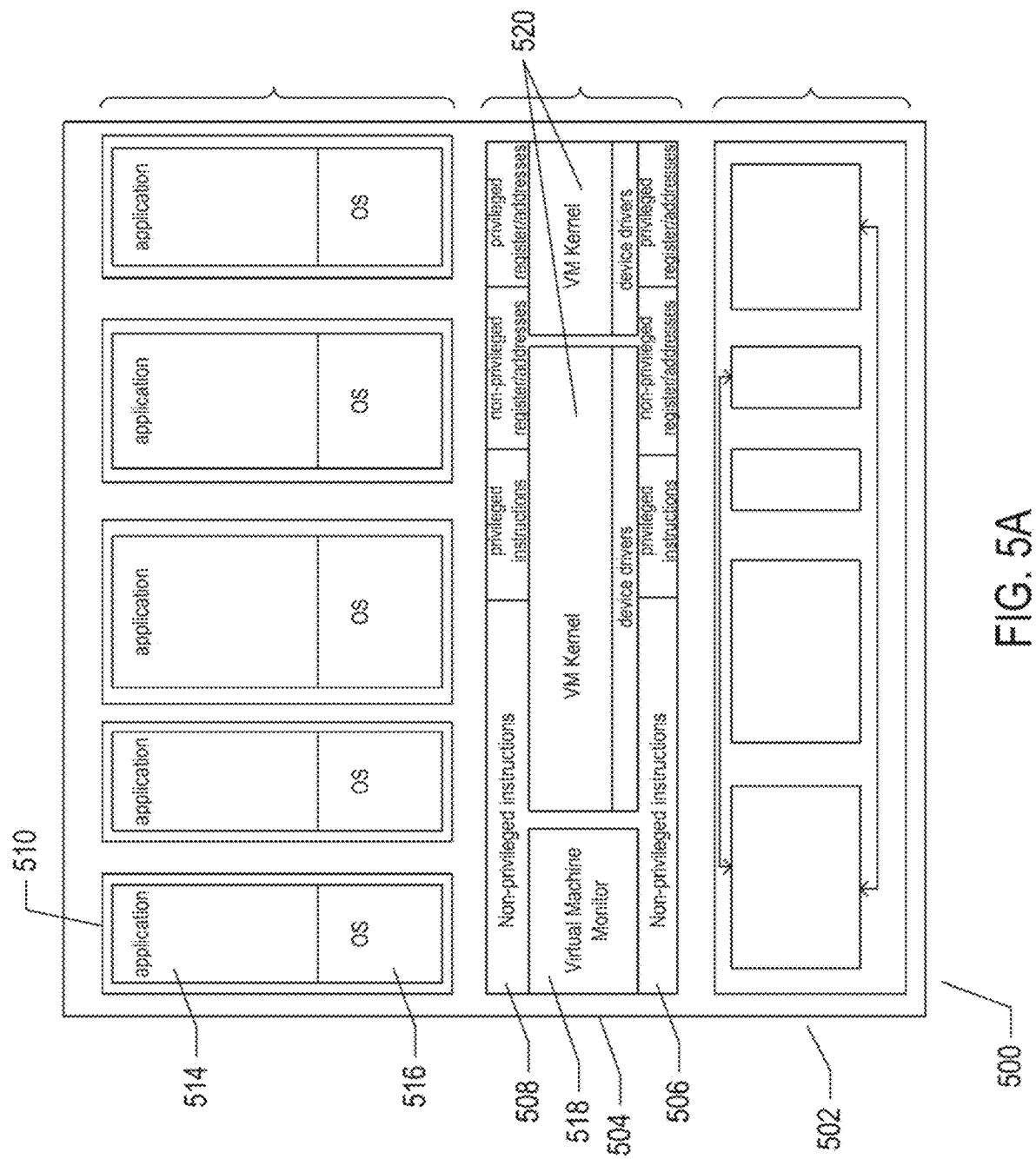
FIGS. 5A-D illustrate two types of virtual machine and virtual-machine execution environments.
Figure 5B:
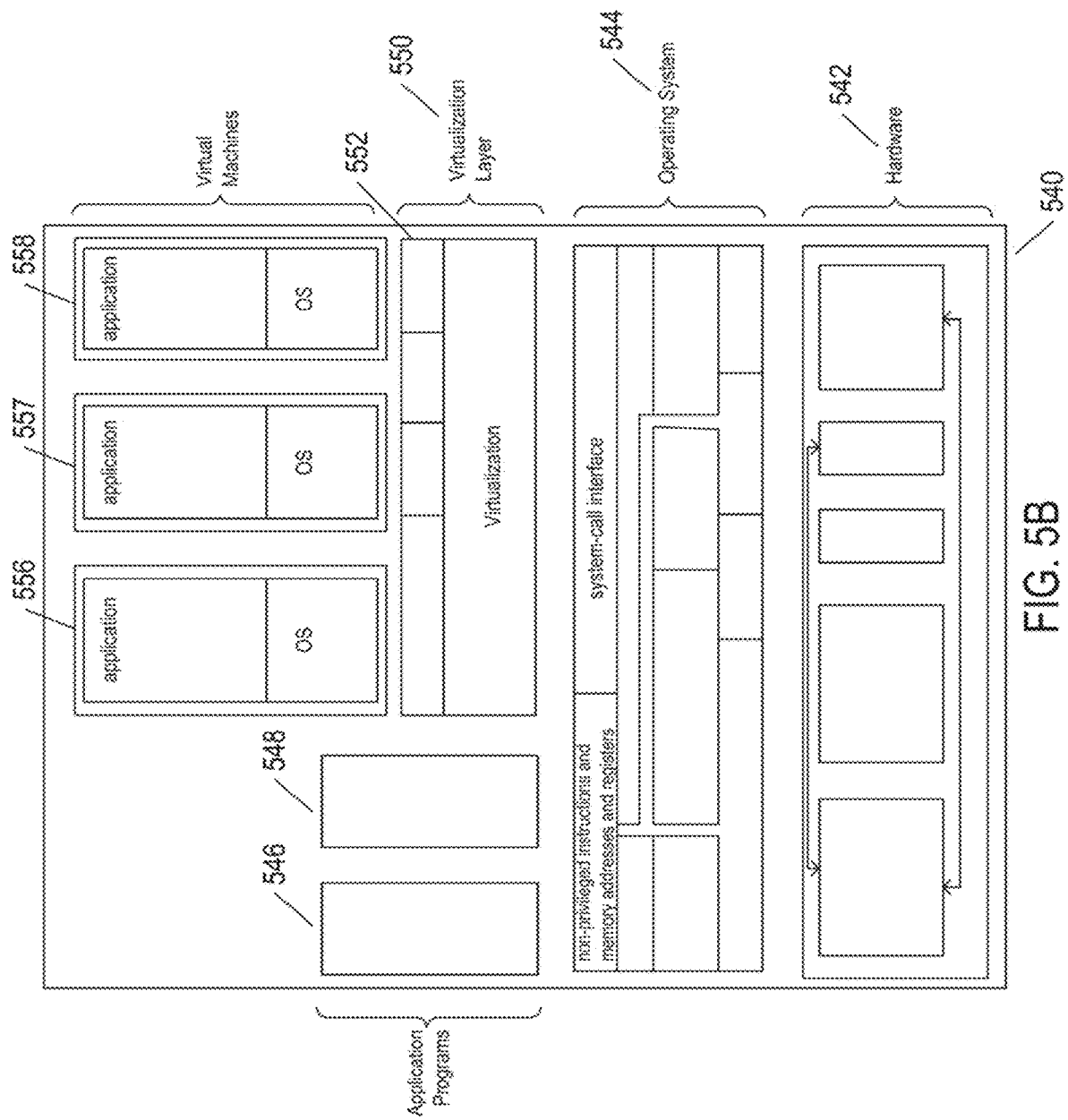

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
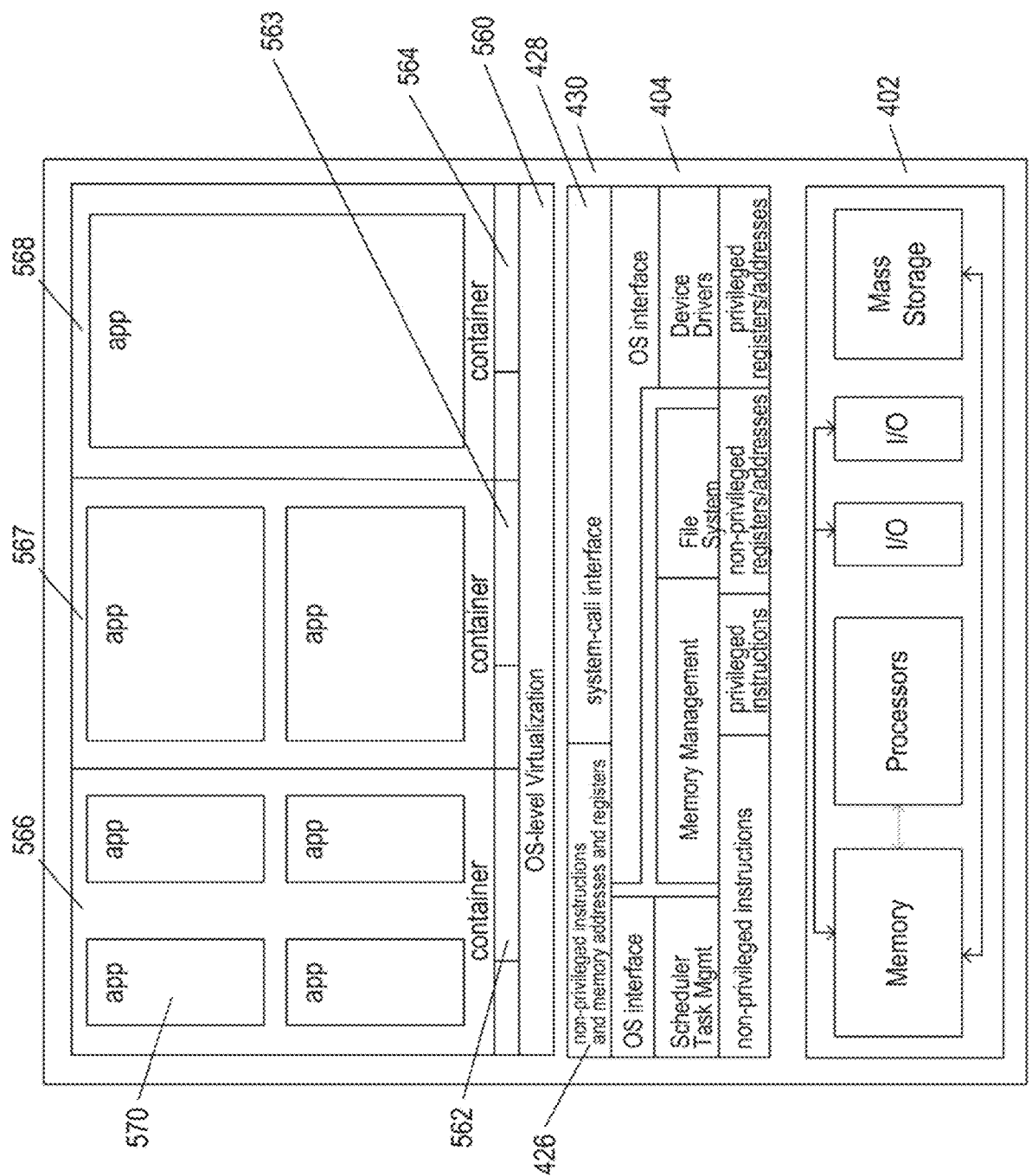

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
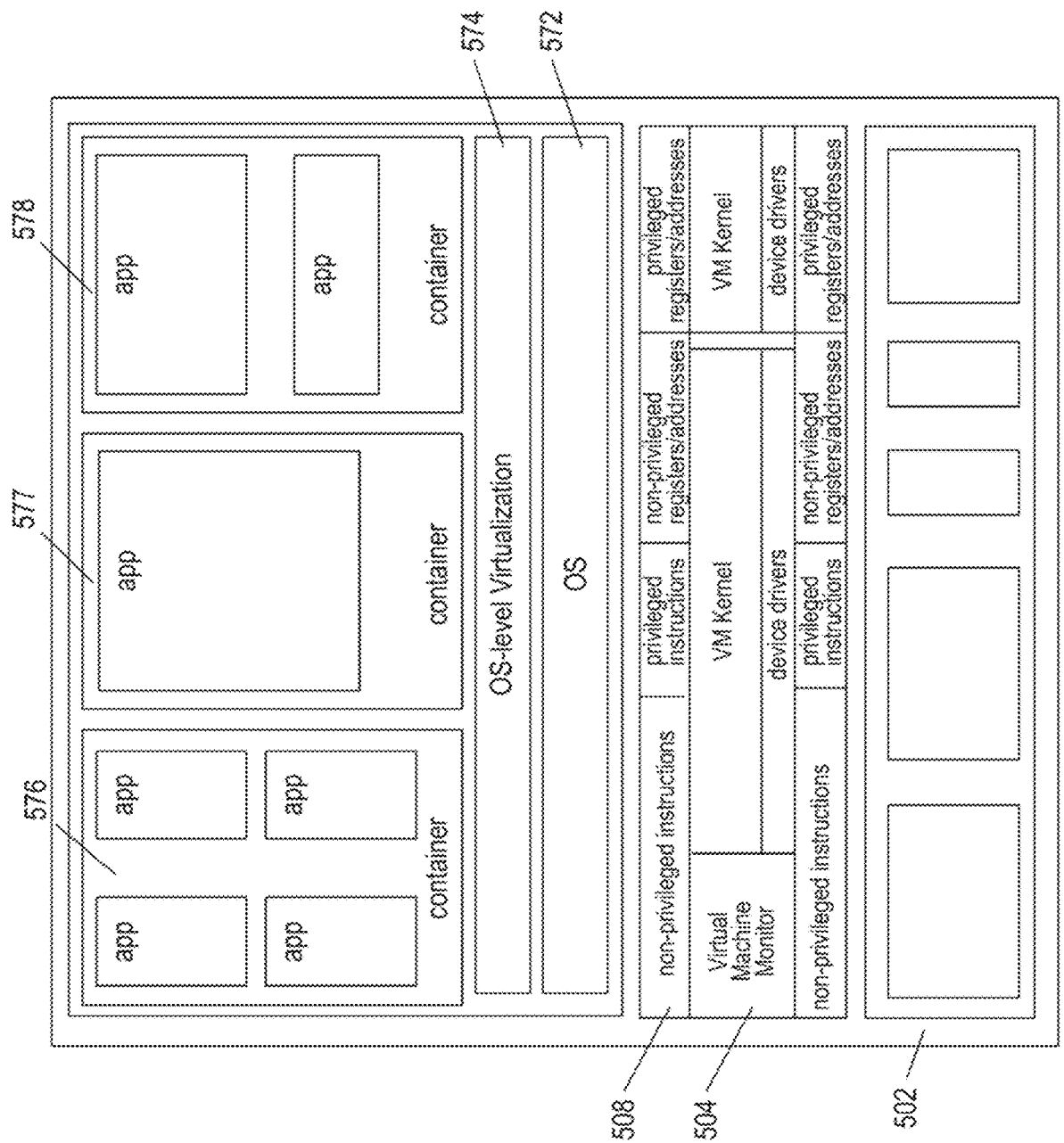

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
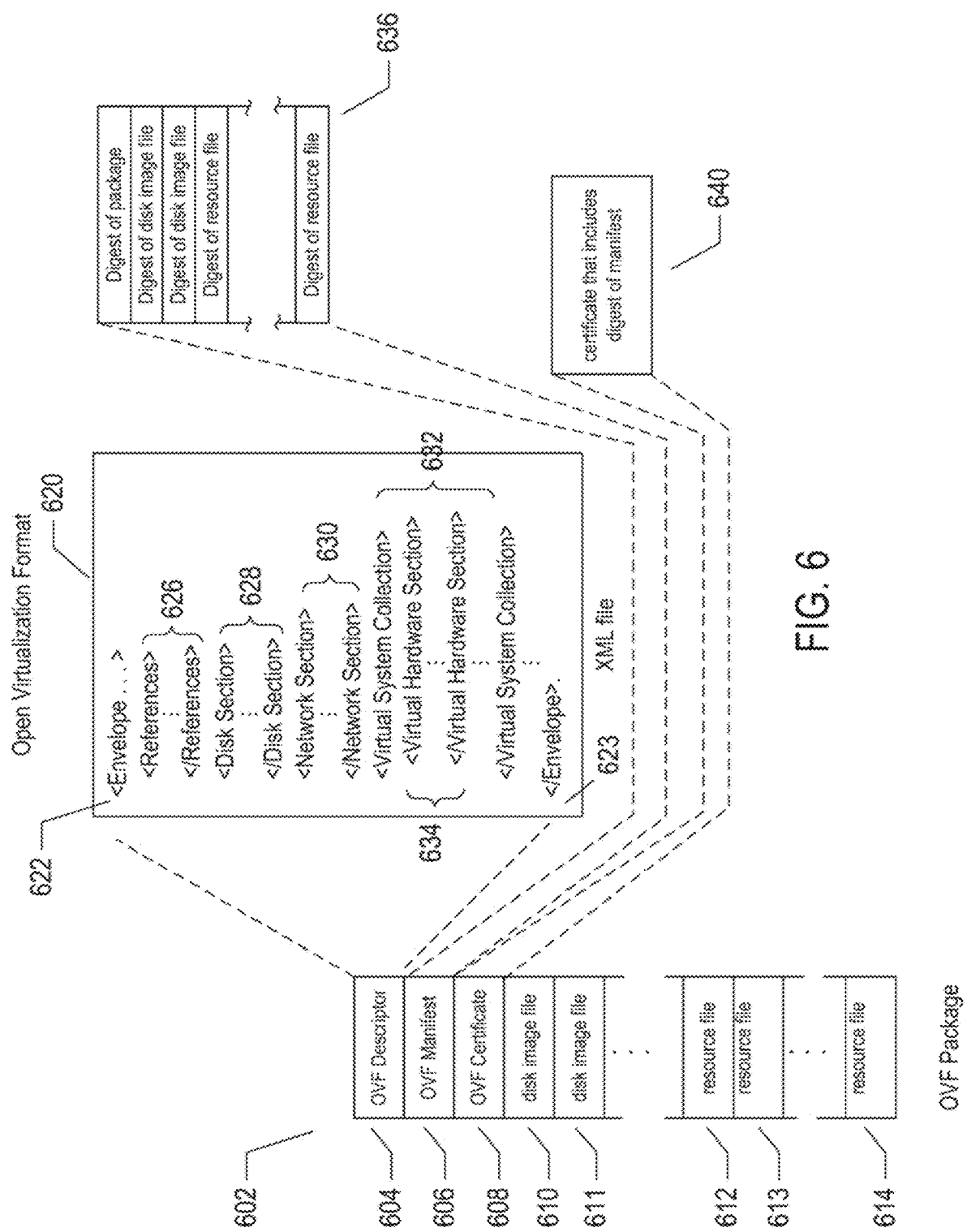
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
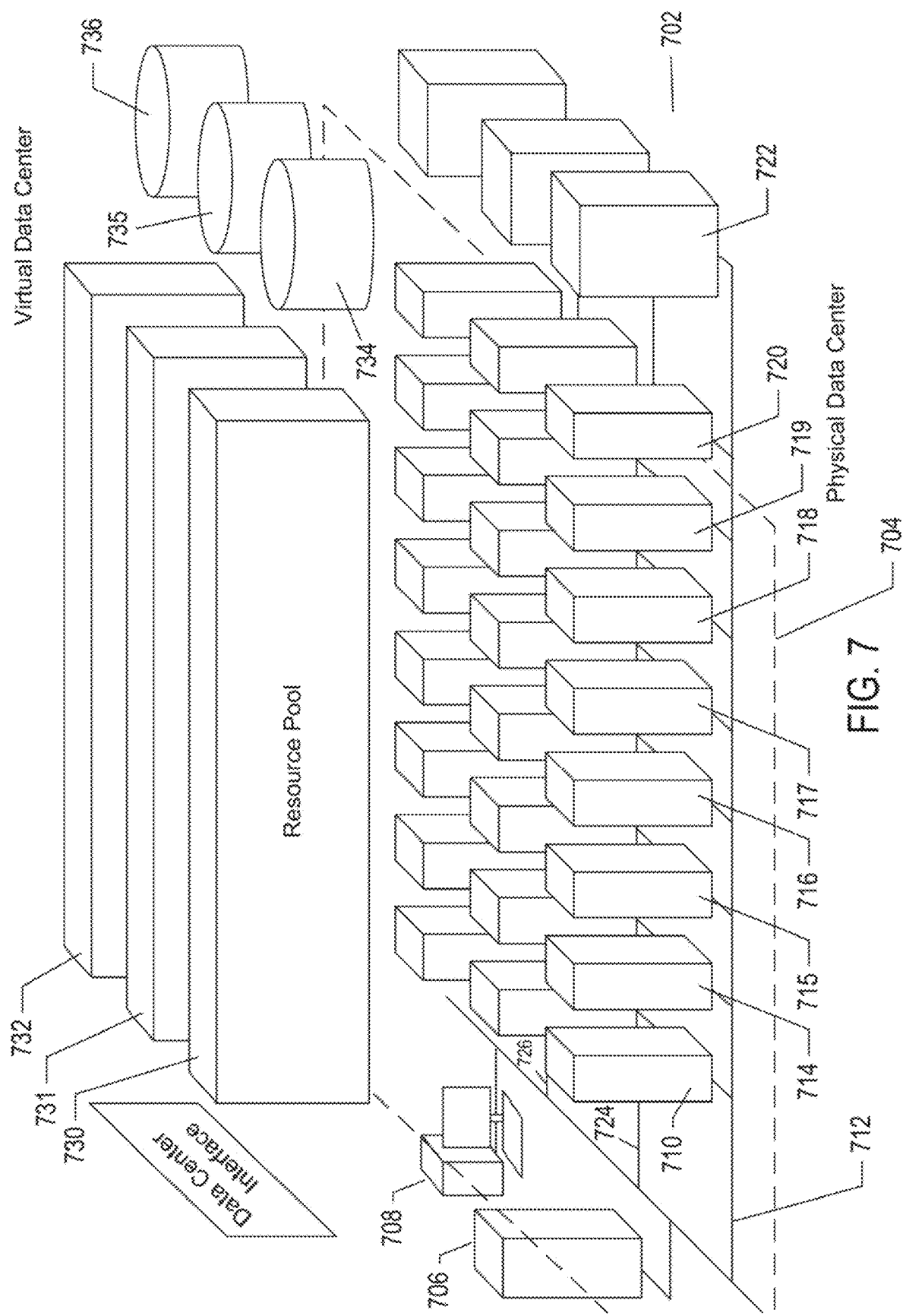
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
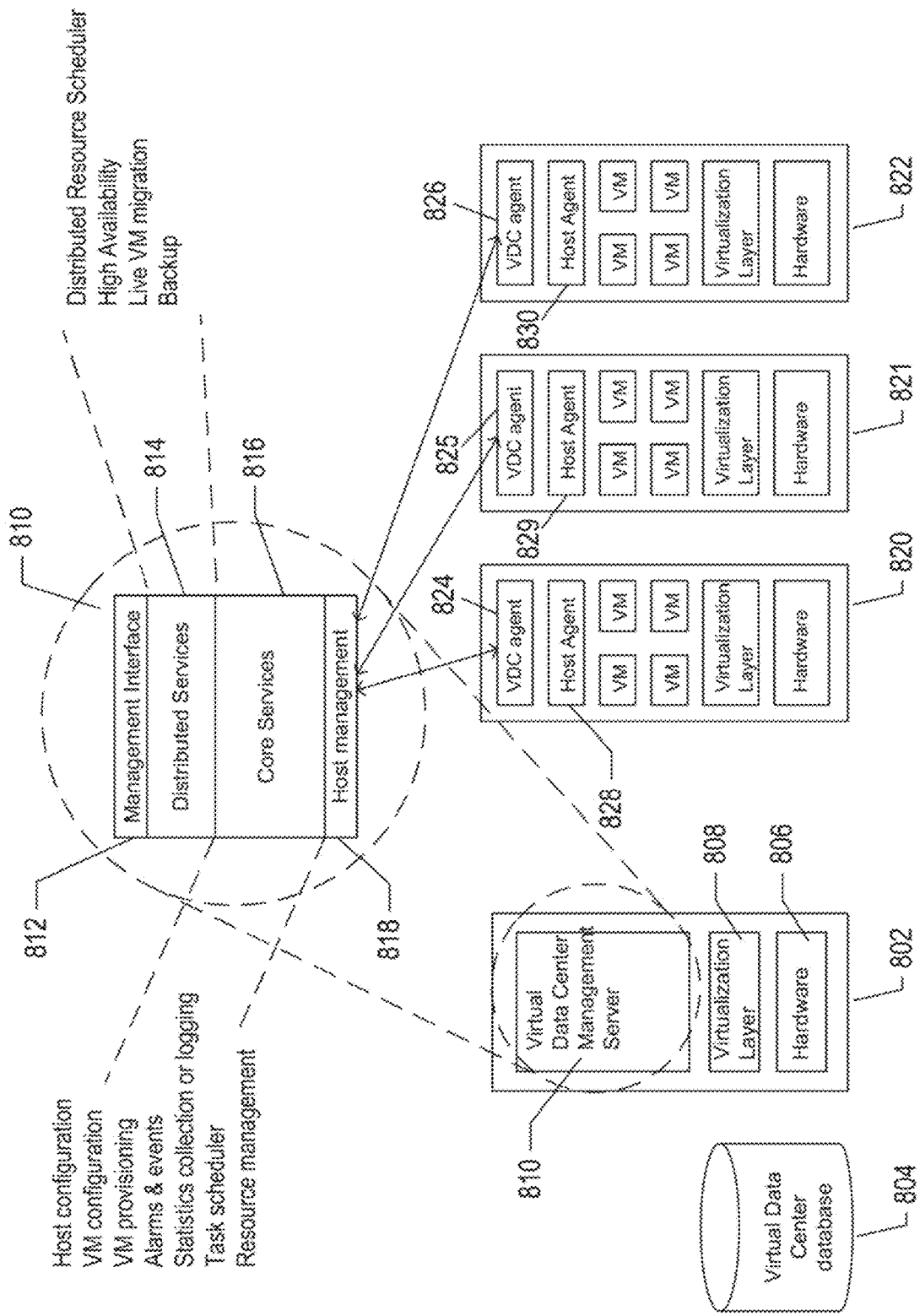
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
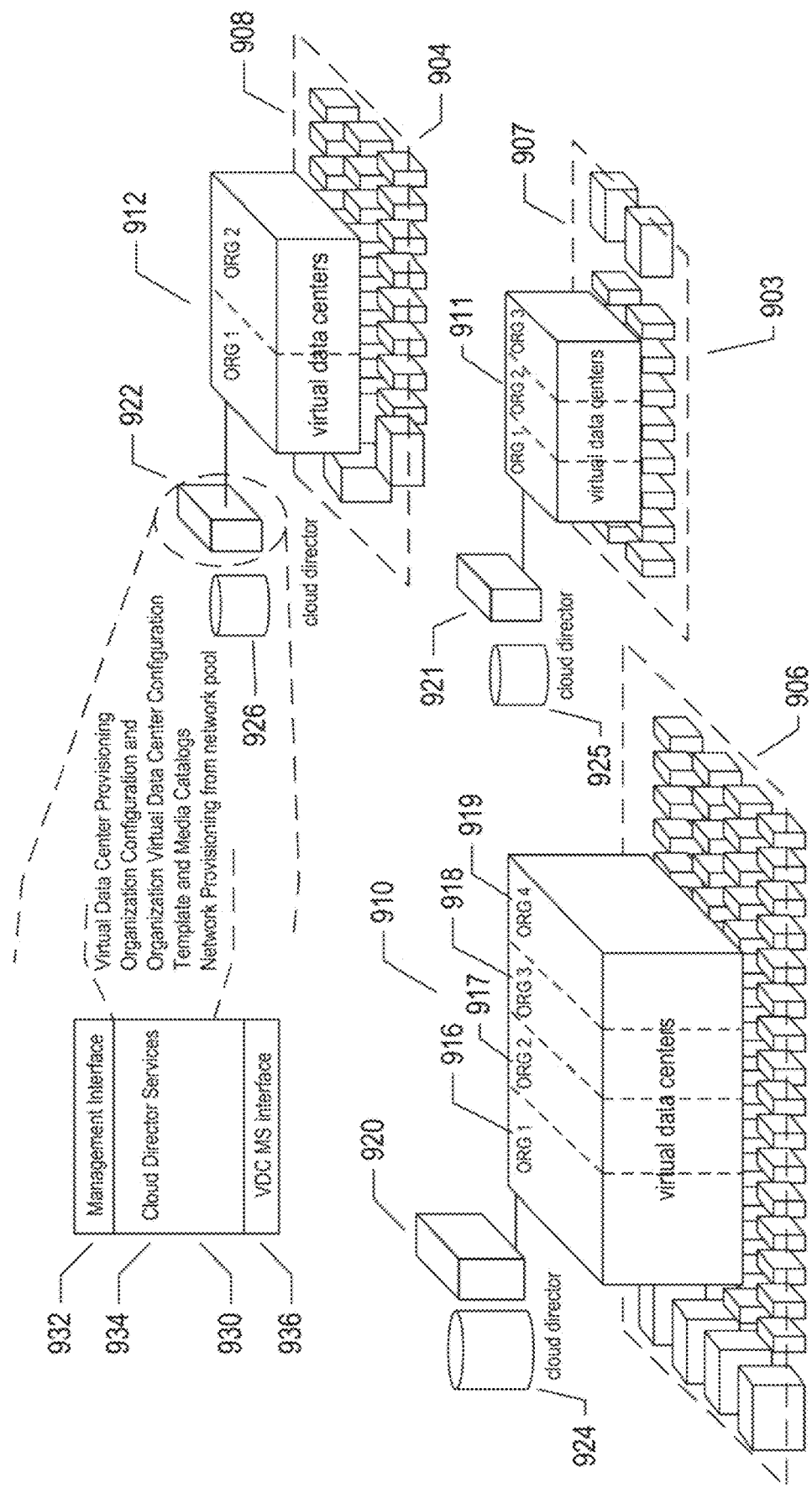
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
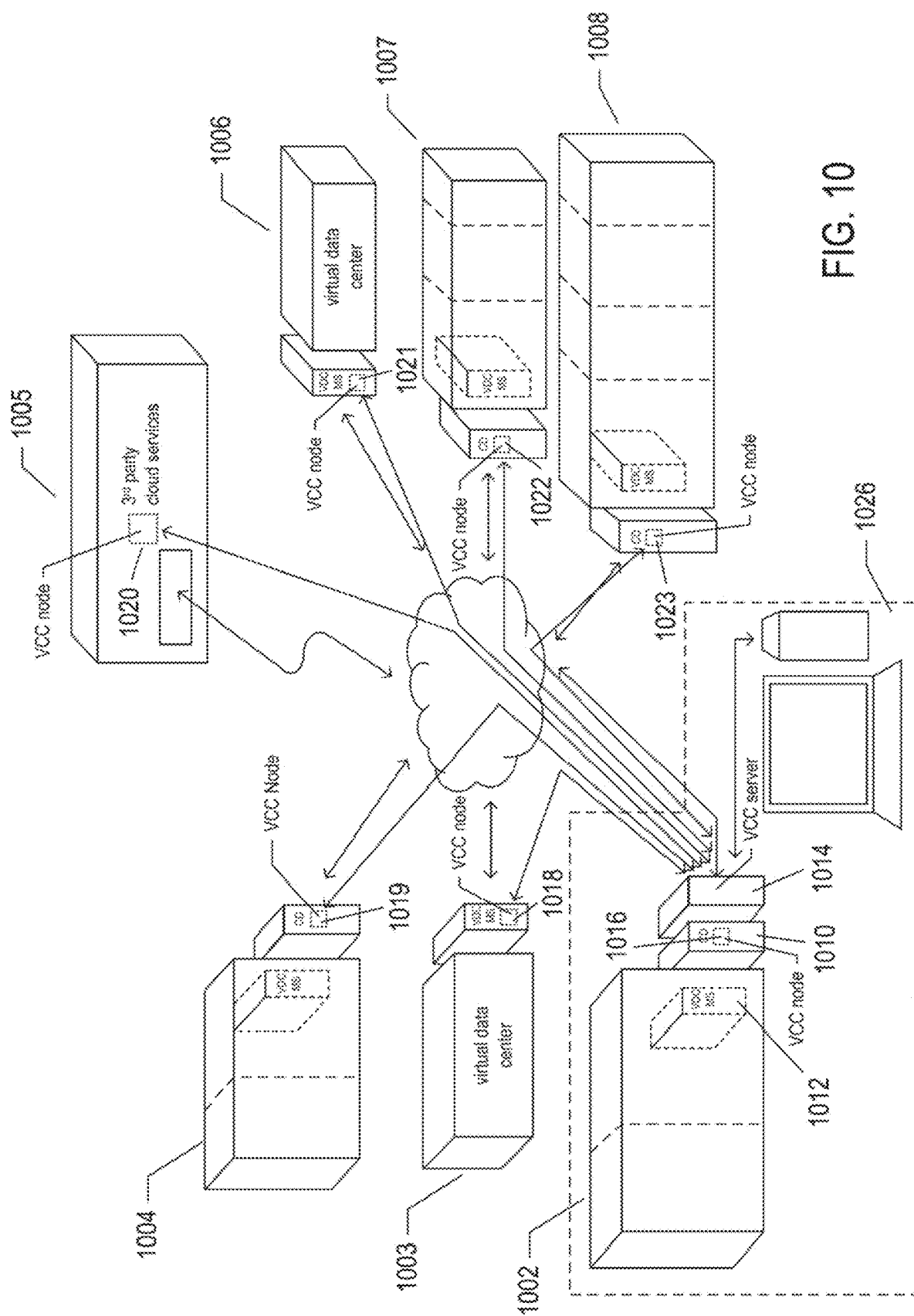
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

The Currently Disclosed Methods and Systems

Figure 11:
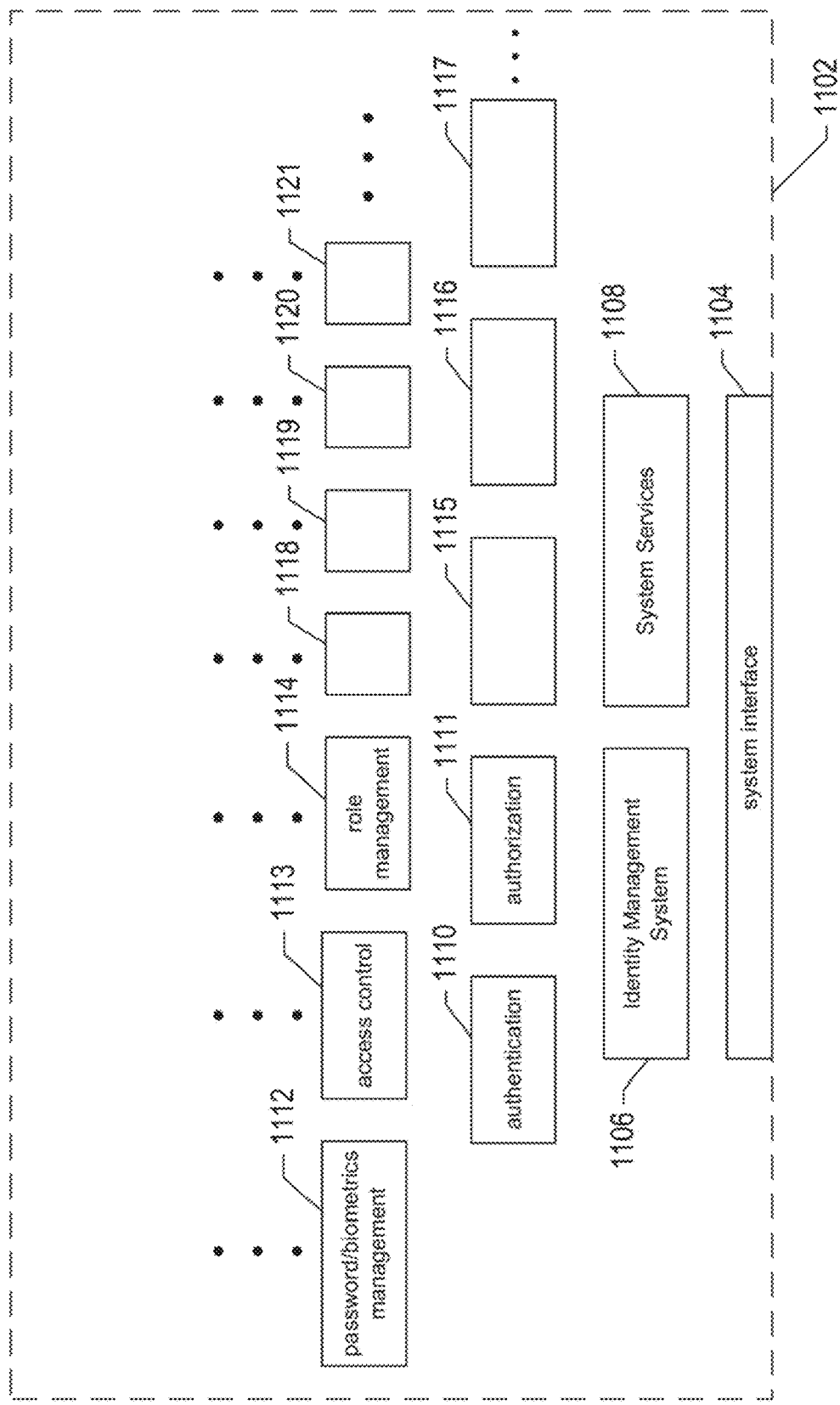
FIG. 11 illustrates the functional modules included in an example identity management system.

FIG. 11 illustrates the functional modules included in an example identity management system. In FIG. 11, and in FIGS. 13A-B discussed below, the outer dashed rectangle 1102 represents a computer system. The computer system may be a single system, such as a personal computer or server, or may be a data center or other type of distributed computer system. The system provides a system interface 1104 through which services, functionalities, and resources are provided to users of the system. System interfaces may include application programming interfaces ("APIs"), various types of resource-access protocols, such as the Representational State Transfer ("REST") protocol, web-page interfaces, and other such interfaces. The example system shown in FIG. 11 includes two high-level functional modules 1106 and 1108 as well as many lower-level modules, routines, and computational resources that support the higher-level functional modules. High-level functional module 1106 represents an identity management system. The identity management system is responsible for controlling access to services and resources through the system interface to clients and users of the system 1102. A familiar type of identity management involves registration of clients and users to establish identities for the clients and users, after which the clients and users provide passwords, biometric information, or other identifying information when logging in to the system through the system interface in order to access system-provided services and resources. A user thus establishes a local digital identity within the system by providing information during the registration process to the identity management system, establishes one or more credentials, such as a password, a username, and other such credentials during or at the completion of the registration process, and then uses one or more of the credentials and/or other identifying information, such as biometric information, to log into the system in order to obtain access to system resources and services. In certain cases, authentication information may be provided automatically by a user's system as part of a resource-access requests.

Many identity management systems employ an authentication module 1110 to authenticate users, during a login process, and, in certain cases, when a user's computer attempts to access resources through the system interface. An authorization 1111 module is employed to authorize users with respect to particular resource-access requests. In one popular type of identity management system, a role-management module 1114 is used to create and distribute various types of roles to users. For example, a user may be designated as an administrator, by associating the user with an administrator role, as well as a user of a particular suite of services, by associating the user with a services-suite-user role. Each role is associated with various types of service-access and resource-access authorizations. An administrator, for example, may be authorized to edit system-configuration files, while users of services may not be authorized to edit system-configuration files. In many systems, the user may login to the systems in the capacity of any one of the different roles associated with the user. In certain systems, users may be automatically granted access rights that represent the union of the access rights corresponding to the roles associated with the user. Many different authorization models are possible. An access-control module 1113 may be employed by an identity management system to provide fine-granularity access control to services and resources based on authorizations provided to users, including explicit authorizations as well as a role-associated authorization. A password/biometrics-management module 1112 may be responsible for associating passwords and biometric information with users and maintaining the passwords and biometric information for use by the authentication module 1110.

Figure 12:
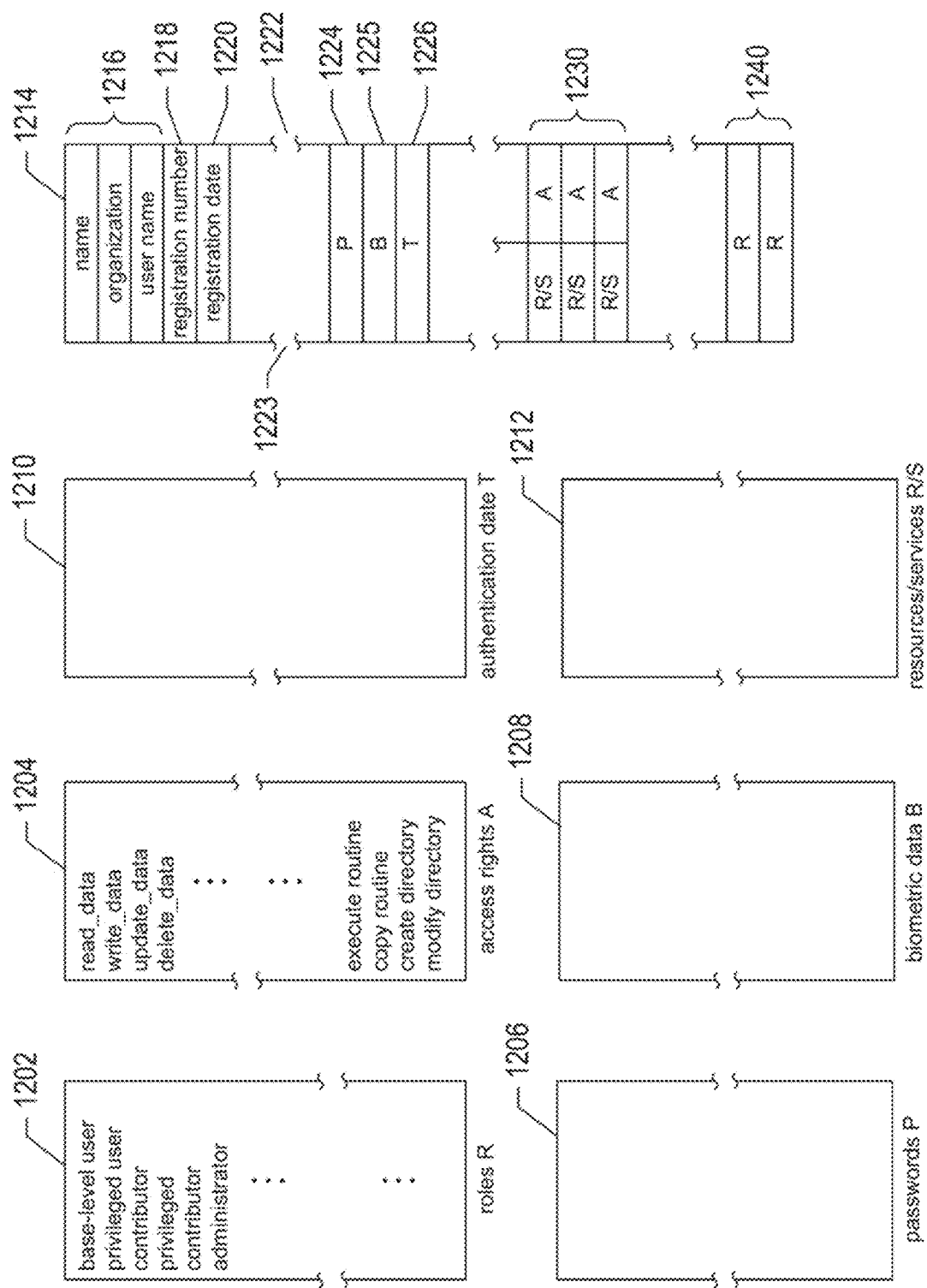
FIG. 12 illustrates various types of data maintained by an exemplary identity management system.

FIG. 12 illustrates various types of data maintained by an exemplary identity management system. The identity management system may store and maintain a list of roles 1202, where each role is associated with particular authorizations for services and resource access provided to users associated with the roles. The identity management system may store information about the various types of access rights 1204 that may be associated with roles, users, services, and resources. The identity management system may store passwords for users 1206, biometric data collected from users that can be subsequently recollected and used during user authentication 1208, and other types of authentication data 1210, such as the answers to various questions that can be used to authenticate a user who has forgotten the user's password. In addition, the identity management system may store lists of the various different types of resources and services 1212 offered through the system interface to users. Each user may be associated with various different types of information that together comprises the user's digital identity 1214. This information may include user's name, the name of the user's organization, and a username provided to the user during the registration process 1216. The information may additionally include a registration number 1218 and a registration date 1220. Broken boundaries 1222 and 1223 indicate that there may be many additional fields containing various types of textural and/or numeric user information. In addition, the information may include references to passwords 1224, biometrics 1225, and other authentication data 1226. Finally, information may contain resource-or-service/access-right pairs 1230 indicating particular access rights granted to the user as well as one or more roles 1240 associated with the user. FIG. 12 illustrates certain of the common types of information that may be maintained by an identity management system, but any particular identity management system may collect and maintain many additional types of information in order to provide many different additional types of identity-management functionalities and services.

Figure 13A:
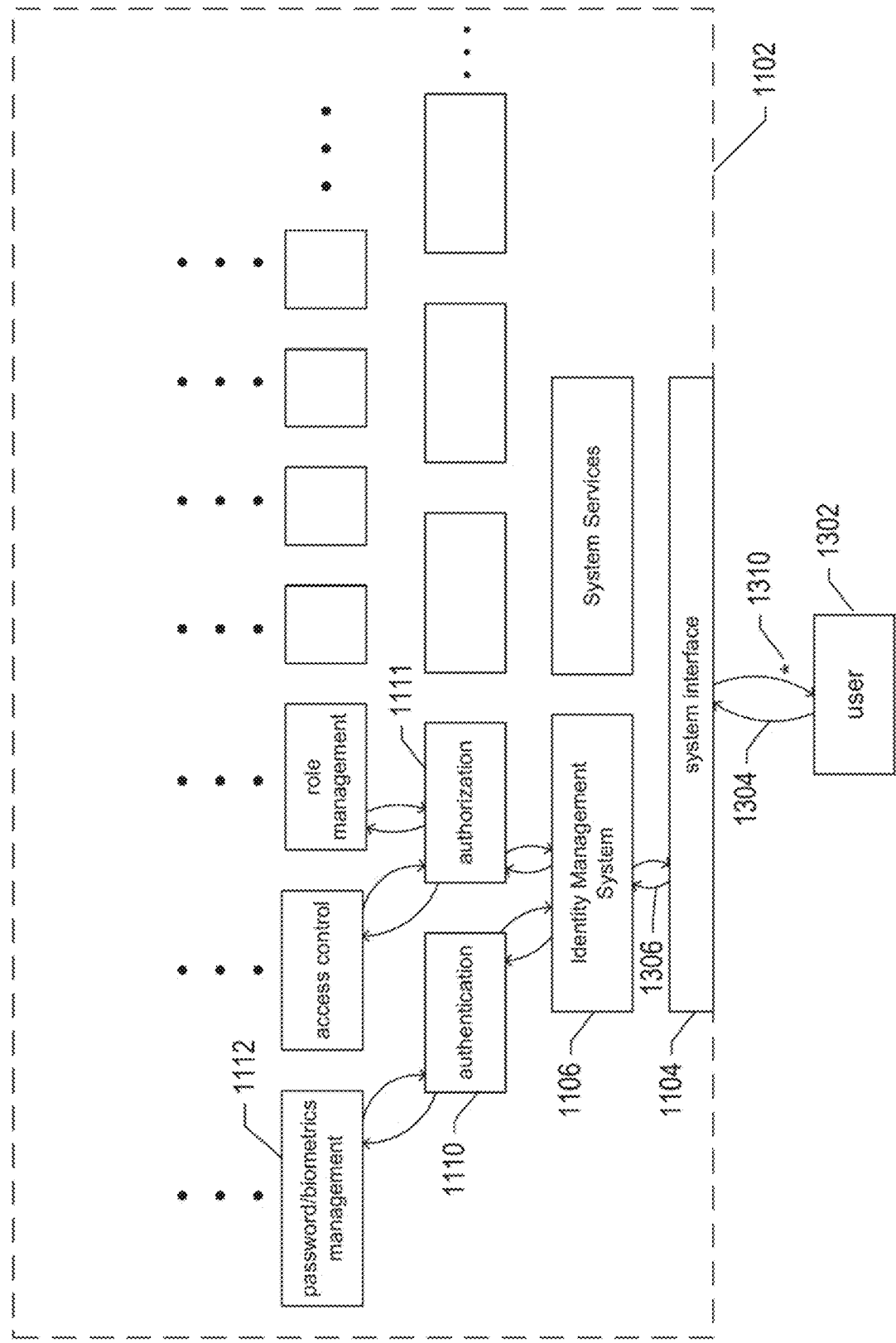
FIGS. 13A-B illustrate a typical interaction between a user and the identity management system of the exemplary system discussed above with reference to FIG. 11.
Figure 13B:
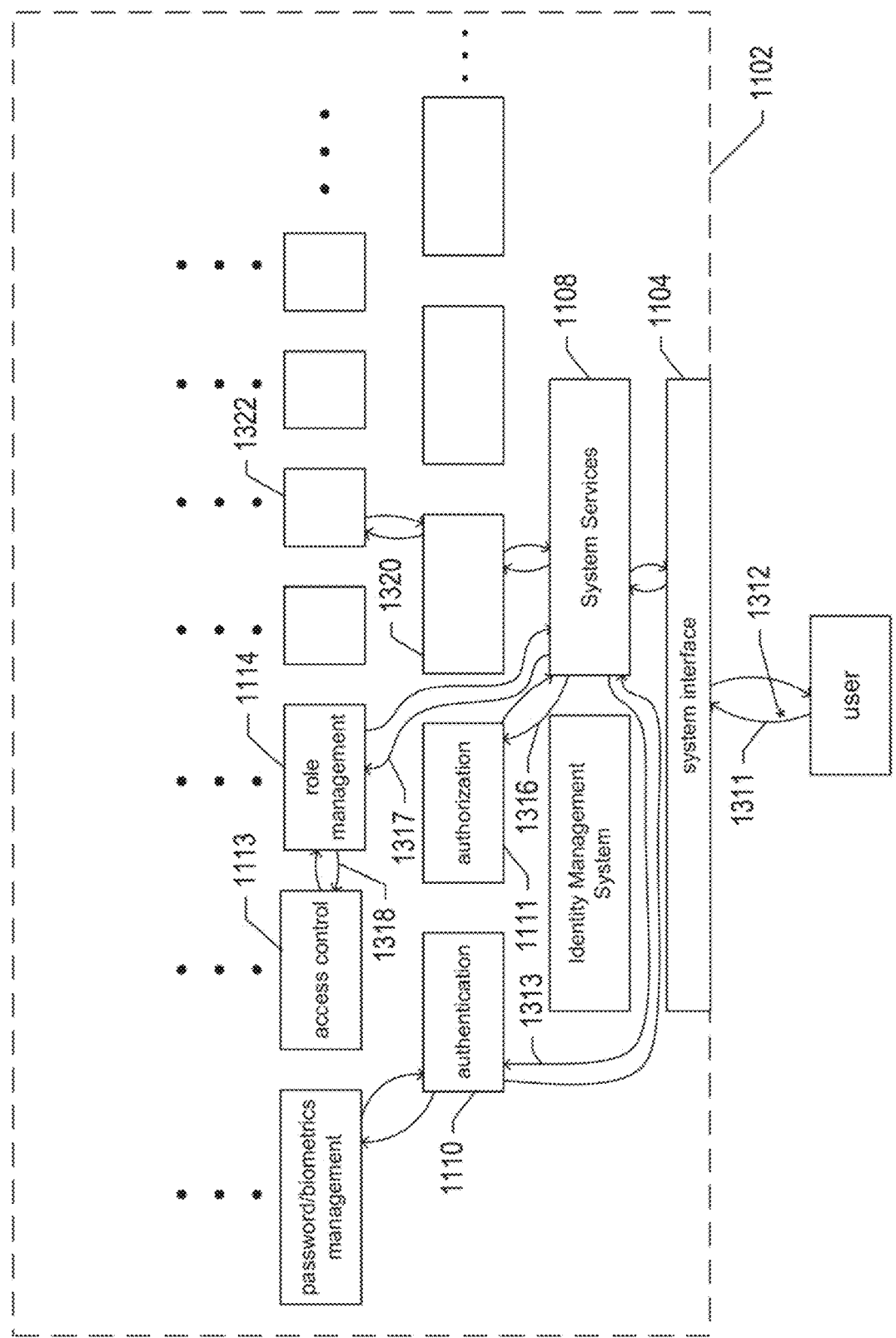

FIGS. 13A-B illustrate a typical interaction between a user and the identity management system of the exemplary system discussed above with reference to FIG. 11. As shown in FIG. 13A, a user 1302 accesses the system 1102 through the user interface 1104 in order to register with the system, as represented by arrow 1304. The system interface, in turn, invokes identity-management-system functionality, as represented by arrow 1306, to carry out the registration process. The identity management system 1106, in turn, invokes authentication-module 1110 functionality which may, in turn, invoke password/biometrics-management-module 1112 functionality to collect identifying information from the user and generate a password and/or additional credentials for the user. The identity-management system may then invoke authorization 1111 functionality to establish roles and to assign specific resource-access and services-access authorizations for the user. Upon completion of the registration process, the system may return one or more credentials 1310 to the user to facilitate subsequent access to system-provided services and resources. As shown in FIG. 13B, a user may subsequently attempt to access a system service, as represented by arrow 1311, via the system interface 1104. The user may supply one or more credentials 1312, during a login phase, which are forwarded 1313 to the authentication module 1110, for evaluation and verification. Successful verification establishes a link between the accessing user and the user's digital identity. The authorization module 1111, role-management module 1114, and access-control module 1113 are then invoked to verify that the user is authorized to access the requested service, as represented by arrows 1316-1318, after which the system services module 1108 invokes additional modules 1320 and 1322 to provide the requested service. Various different types of credentials may be supplied by user during access operations. In certain models, a login process establishes a secure connection between the user's computer and the system 1102, with the session identifier associated with the connection used, following login, to identify the user and provide access to system services and resources according to authorizations provided to the user. There are many different types of models for using user identities to control access to system services and resources, and many additional types of functionalities provided by identity management systems. The reverse federated identity-management system to which the current document is directed, discussed below, is designed to interact with any of the many different types of identity-management systems to provision local identities within resource-providing and services-providing systems on behalf of various types of distributed resource-distribution systems.

Figure 14A:
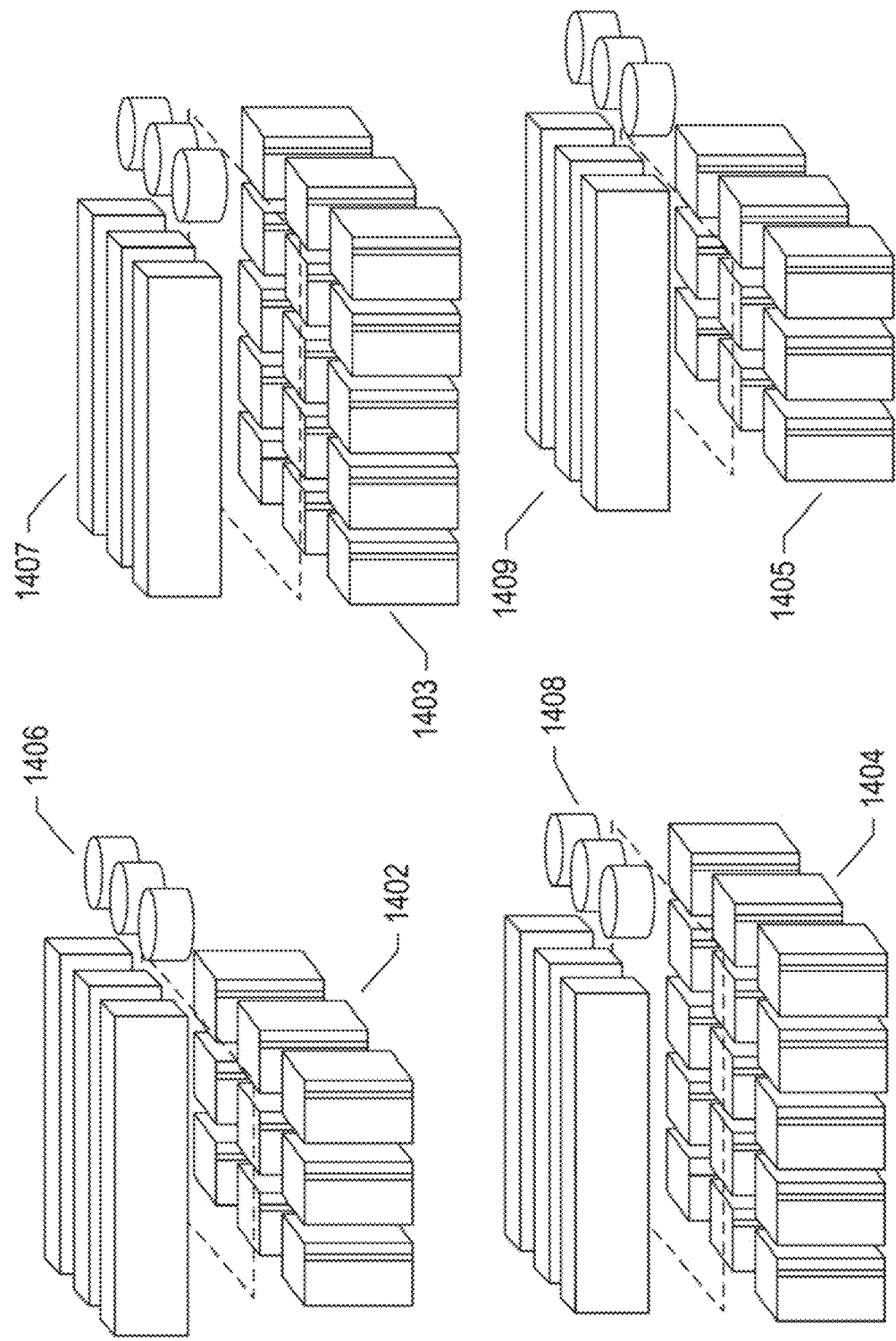
FIGS. 14A-B illustrate multiple distributed computing systems.
Figure 14B:
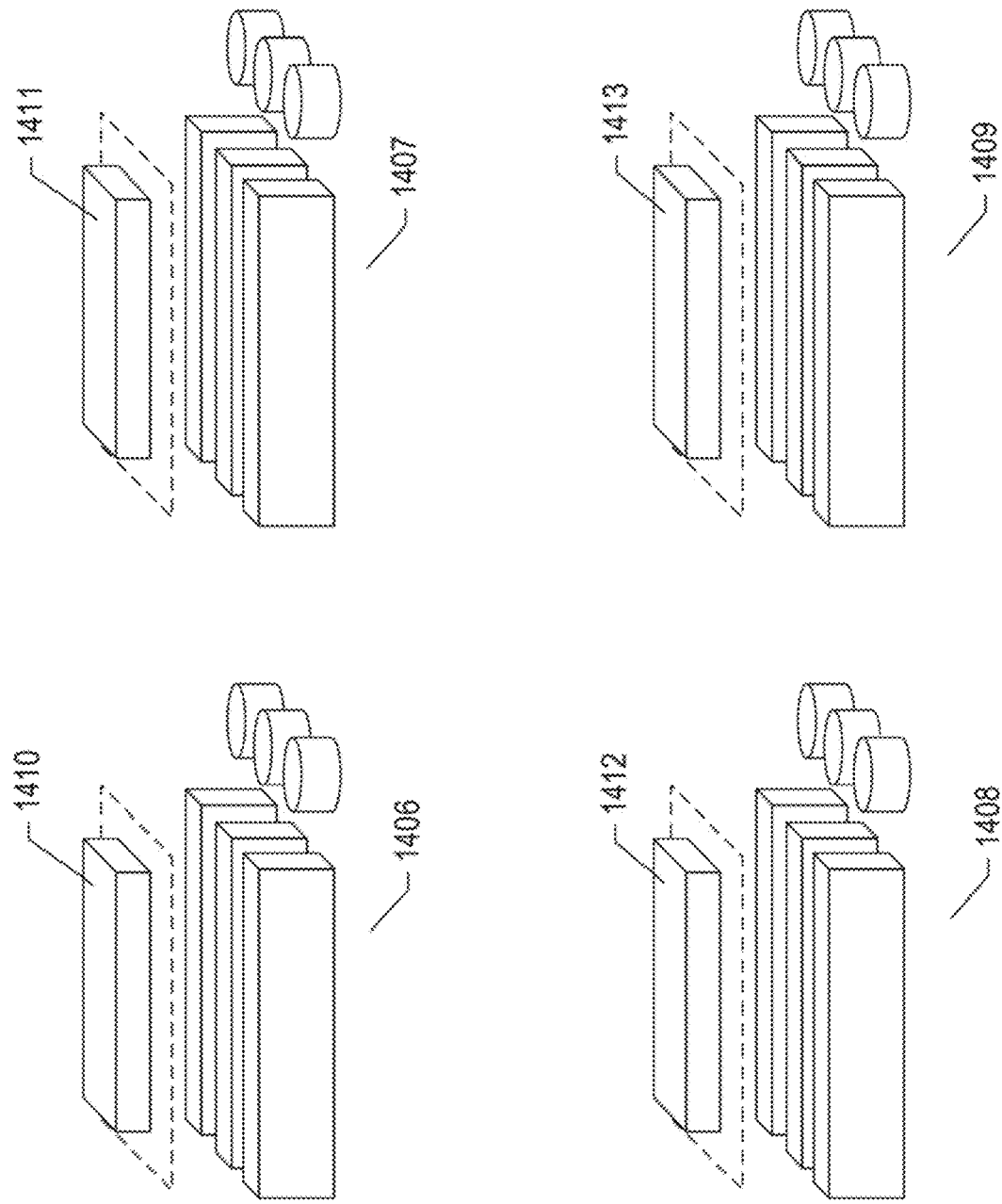

FIGS. 14A-B illustrate multiple distributed computing systems. As shown in FIG. 14A, four different physical data centers 1402-1405, owned and controlled by four different organizations, are abstracted as four different virtual data centers 1406-1409, respectively, as discussed above in the preceding subsection. As shown in FIG. 14B, the four different virtual data centers 1406-1409 are each further abstracted by a system interface 1410-1413, respectively. As discussed above, virtual data centers and system interfaces are, in fact, physical entities, and are implemented by physical components, including processor-controlled system and computer instructions that control the processors, but they also, in a sense, provide higher-level abstractions of the underlying physical data centers. In the absence of a federated identity-management system, a user that accesses the four different systems through the four system interfaces 1410-1413 needs to establish a digital identity with each distributed computing system, independently, and, when accessing the systems, needs to login separately to each system, generally providing different credentials to each of the systems. Because of the separate identity-management systems within each of the four systems 1406-1409, a service provided to a user by a first system which attempts to access services or resources from a second system on behalf of the user would need to collect sufficient information from the user to authenticate the user to the second system. However, this represents a significant potential for security breaches and for compromise of a user's digital identity, since the first system would be provided authentication information particular to the second system. Furthermore, collection of all of the authentication information from a user may represent a significant increase in the complexity of system interfaces as well as a significant temporal and authentication-information-management burden to the user.

Figure 15A:
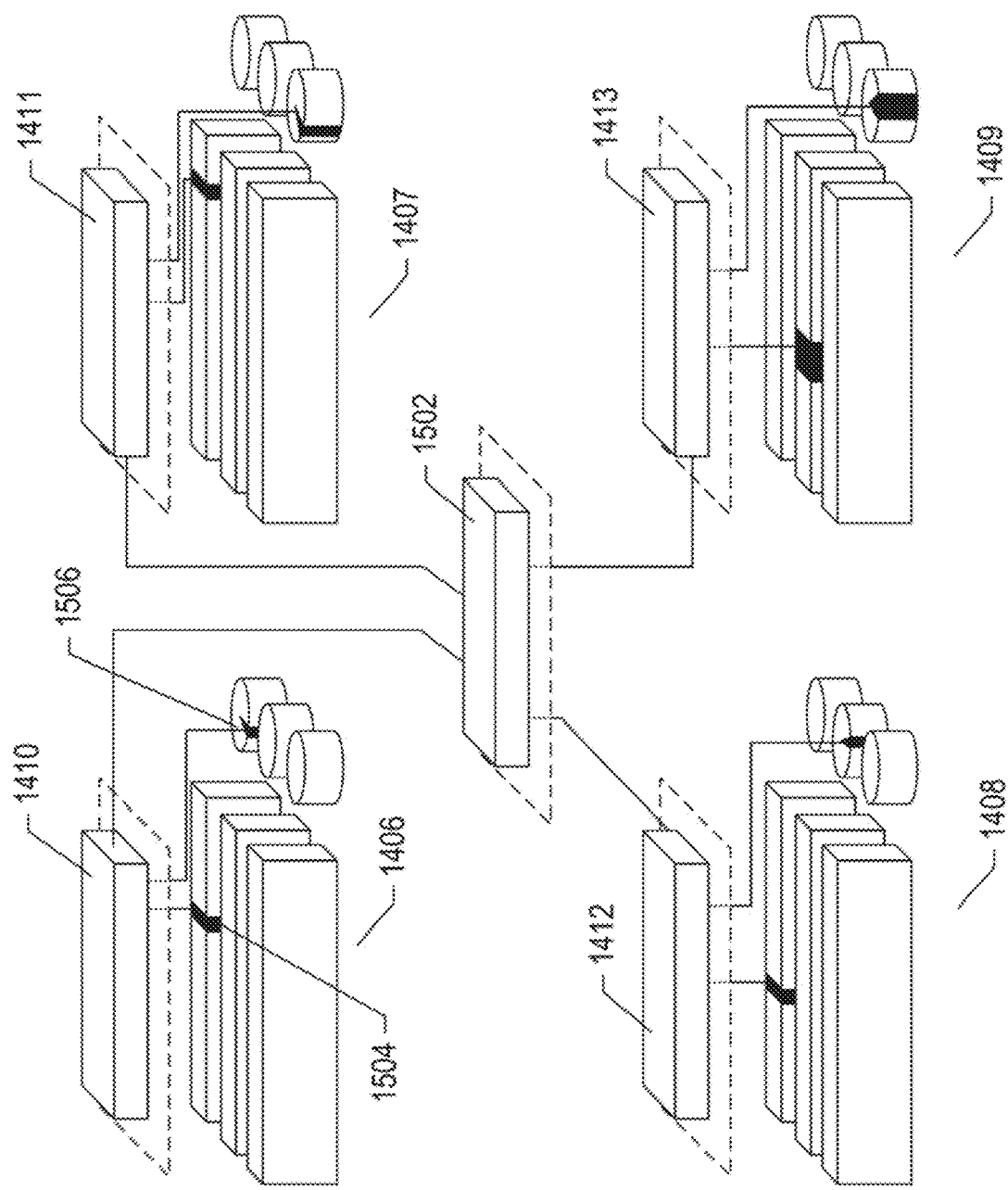
FIGS. 15A-D illustrate a federated identity-management system.

FIGS. 15A-D illustrate a federated identity-management system. Federated identity-management systems have been developed, and continued to be developed, to address the problems discussed above with respect to identity management in multiple distributed computer systems with separate management domains controlled by different organizations. In FIG. 15A, a distributed federated identity-management system 1502 is added to the distributed-computer-system environment discussed above with reference to FIG. 14B. The distributed federated identity-management system 1502 is allocated small amounts of resources by each of the distributed computer systems, such as resources 1504 and 1506 allocated to the distributed federated identity-management system in distributed computer system 1406. The distributed federated identity-management system executes, in distributed fashion, in each of the distributed computer systems 1406-1409.

Figure 15B:
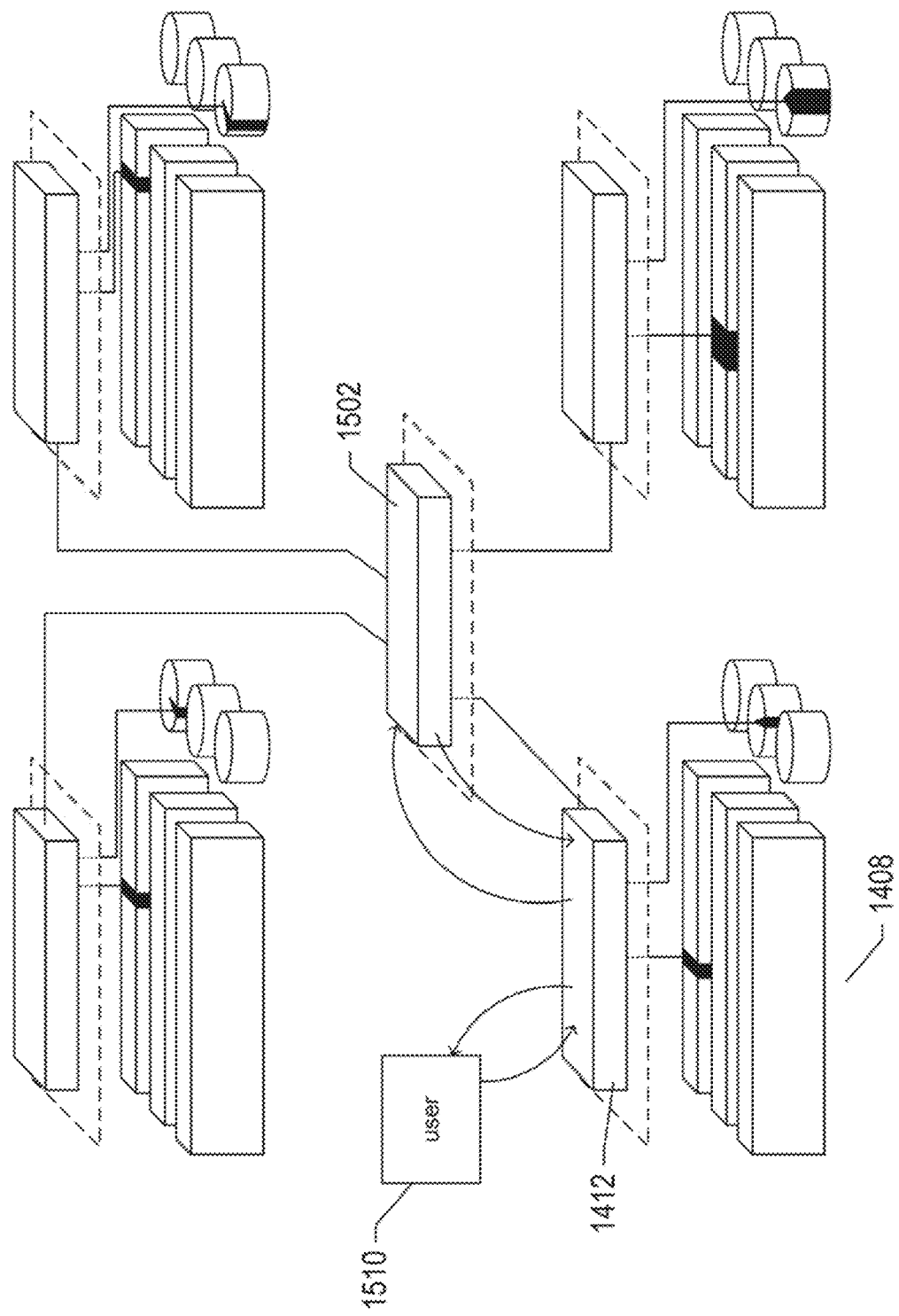
Figure 15C:
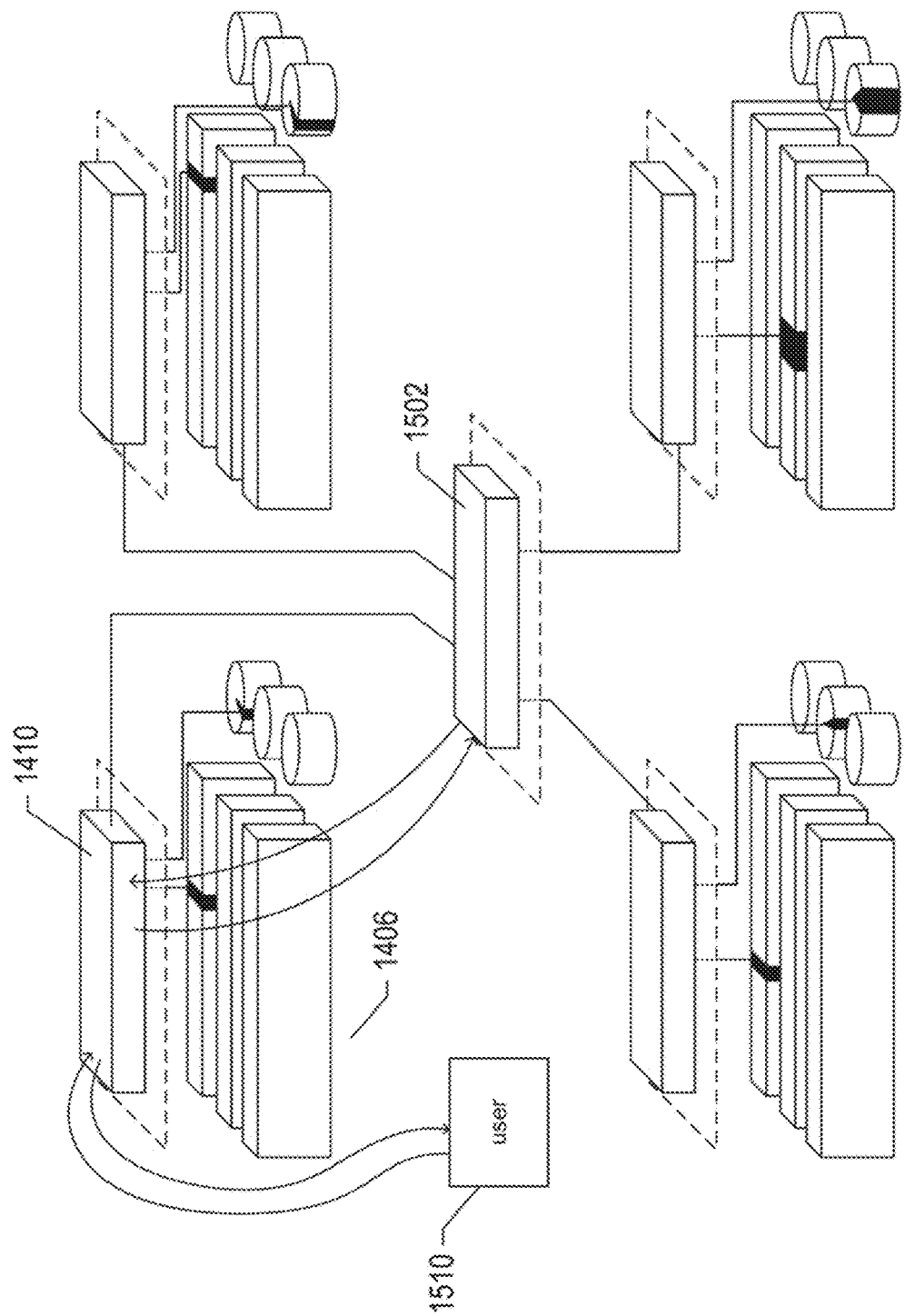

FIGS. 15B-C illustrate operation of the distributed federated identity-management system. In FIG. 15B, a user system 1510 registers with distributed computer system 1408 via system interface 1412 to obtain credentials and subsequent access to services and resources provided by distributed computer system 1408. During the registration process, the user is provided a local identity with respect to distributed computer system 1408. In addition, the identity management system within distributed computer system 1408 cooperates with the distributed federated identity-management system 1502 to register the user with the distributed federated identity-management system. When, as shown in FIG. 15C, the user 1510 registers via system interface 1410 with distributed computer system 1406, the local identity provided to the user via system interface 1410 is also communicated to the distributed federated identity-management system 1502, allowing the distributed federated identity-management system to link the local identity provided to the user via system interface 1410 with the local identity provided to the user via system interface 1412.

Figure 15D:
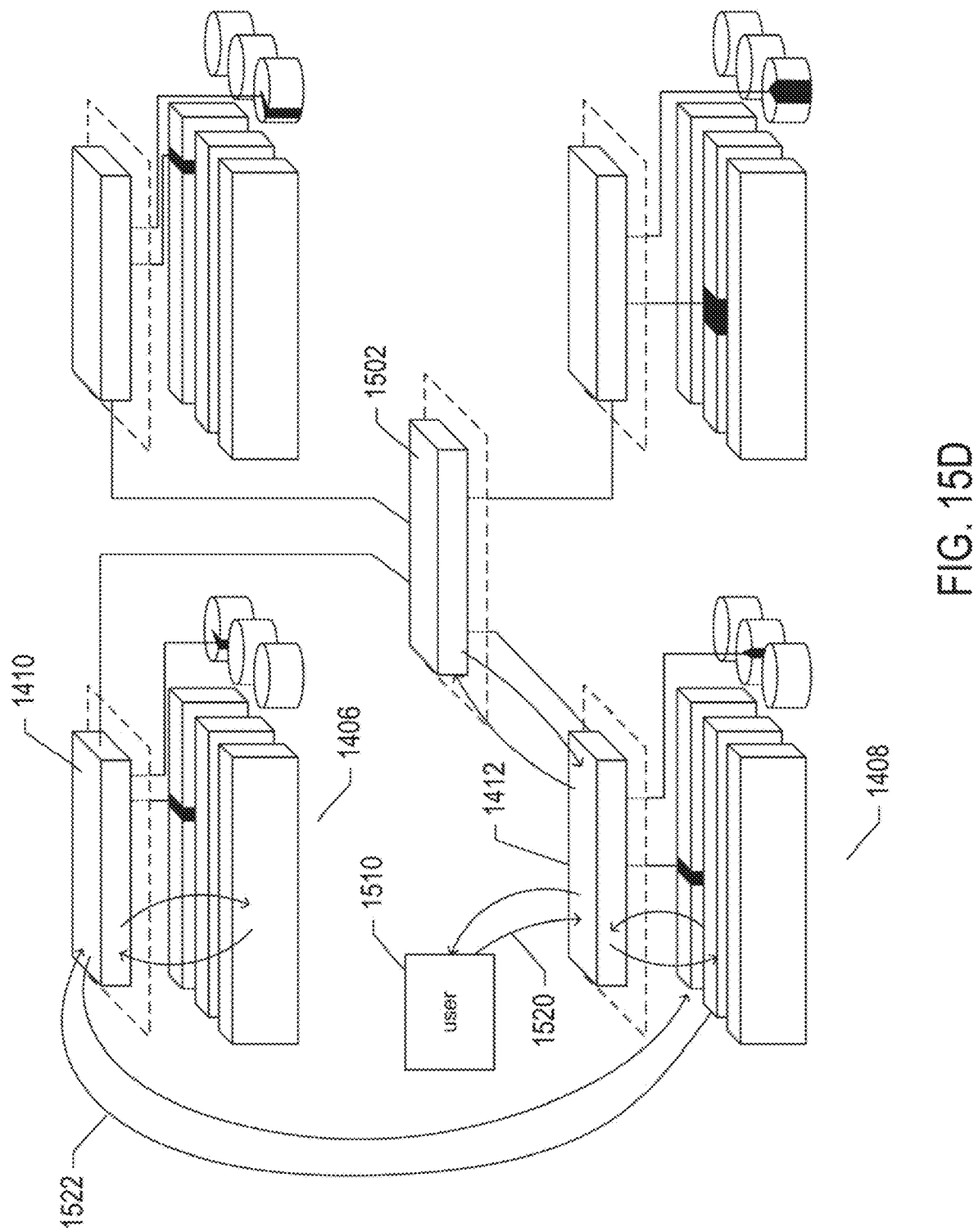

FIG. 15D illustrates an advantage provided by the distributed federated identity-management system. In FIG. 15D, the user 1510 accesses a service provided by distributed computer system 1408 via system interface 1412, as indicated by arrow 1520. During provision of the service by distributed computer system 1408, a service module within distributed computer system 1408 needs to access a service or resource provided by distributed computer system 1406 on behalf of the user. The service module accesses the distributed federated identity-management system 1502 to determine whether the user represented by the local identifier within distributed computer system 1408 is linked to a local identity within distributed computer system 1406. When the linkage is confirmed and the local identity within distributed computer system 1406 is returned to the service module by the distributed federated identity-management system 1502, the service module accesses a service via system interface 1410, as represented by arrow 1522, using the local identity of the user maintained by distributed computer system 1406. Thus, the user is able to access what is essentially a distributed service provided by the combination of distributed computer systems 1406 and 1408 without separately being authenticated by both distributed computer systems 1406 and 1408. A distributed federated identity-management system may maintain information about authorizations provided by each of the distributed computer systems to a particular user so that the user's authorization to access a distributed service or distributed resource can be determined from local authorizations provided by individual distributed computer systems to the user. Thus, for example, in the user's access to the distributed services illustrated in FIG. 15D, certain distributed-federated-identity-management systems can not only check for linkage between local identities of a particular user in the two distributed computer systems 1406 and 1408, but can also determine whether authorizations provided to the user by the two distributed computer systems are sufficient to allow the user to access a distributed service provided by the two distributed computer systems. In certain cases, the distributed federated identity-management system may generate a global identity to which all of a user's local identities are linked, to facilitate user access to multiple distributed computer systems in which the user has local identities.

While federated identity-management systems facilitate user authentication and authorization within computer-system aggregates, such as the cooperating distributed computer systems 1406 and 1408 discussed above with reference to FIG. 15D, they do not address many of the emerging problems, mentioned above, that arise in more recently developed distributed resource-distribution systems that facilitate resource provision to users, where the resources are used by users to whom they have been distributed by the distributed resource-distribution systems over significant periods of time while remaining under at least partial local management within the distributed computer systems that provide the resources to the users via the distributed resource-distribution systems. FIGS. 16A-E illustrate this newly emerging problem domain as well as the currently disclosed distributed reverse federated identity-management system that addresses problems within the newly emerging problems.

Figure 16A:
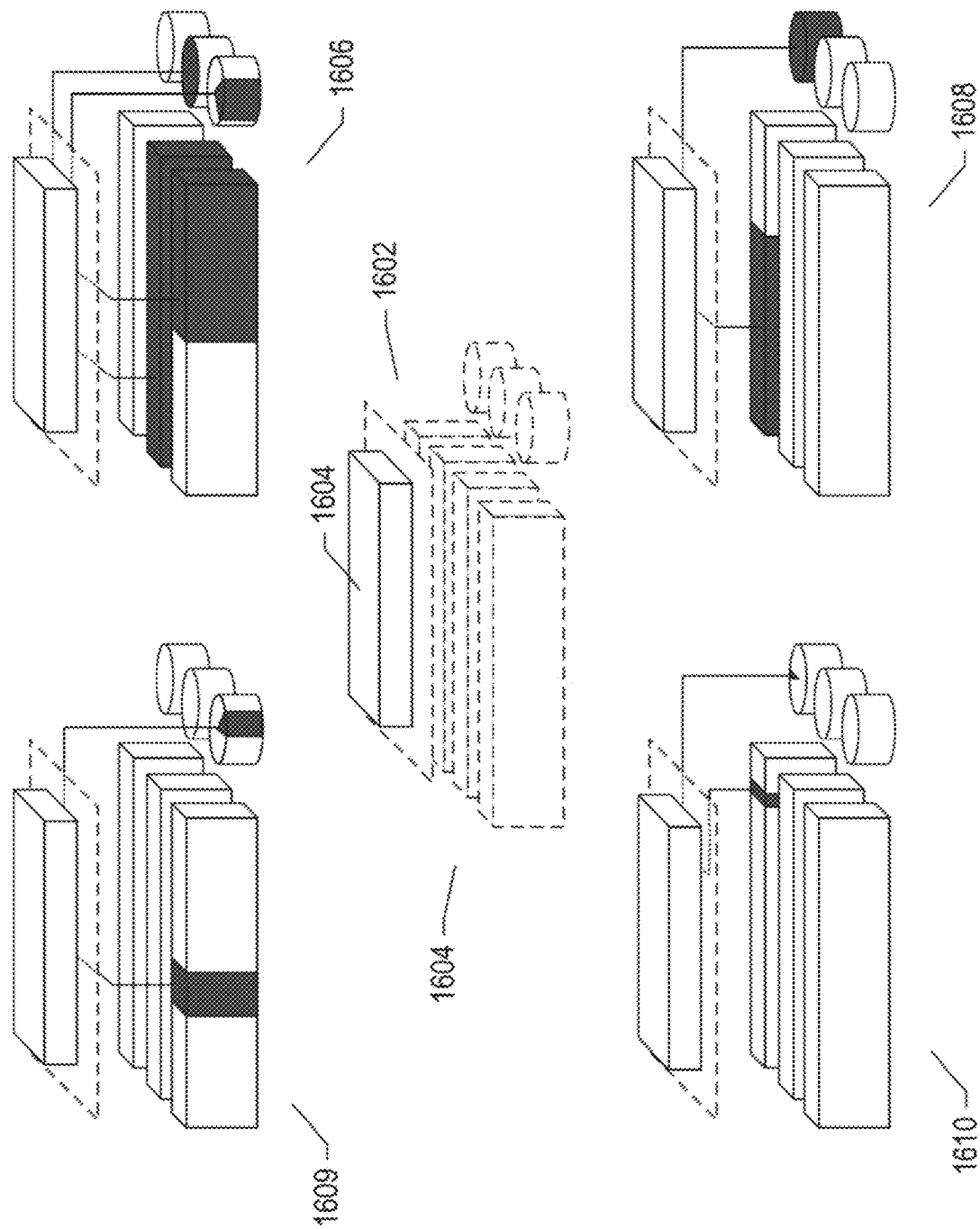
FIGS. 16A-E illustrate a newly emerging problem domain as well as the currently disclosed distributed reverse federated identity-management system that addresses problems within the newly emerging problems.

FIG. 16A illustrates a distributed resource-distribution system. The distributed resource-distribution system 1602 includes a system interface 1604 and a virtual data center 1604 that includes resources provided by the distributed resource-distribution system to users and clients. However, the virtual data center 1604 is illustrated using dashed lines to indicate that the virtual data center is not a physical component of the distributed resource-distribution system, but is instead a collection of resources allocated to the distributed resource-distribution system by remote distributed computing systems, including distributed computing system 1606 and distributed computing system 1608. Note that the term "remote" is used to indicate that the resources allocated to the distributed resource-distribution system for distribution to users by the distributed resource-distribution system are physical components of other computing systems. The distributed resource-distribution system may execute, in part, on these systems and on additional systems, but these systems and additional systems are, in a sense, remote to the logical distributed resource-distribution system, which may have no separate physical components or may have only a relatively small collection of separate physical components exclusively managed by the distributed resource-distribution system. In the example shown in FIG. 16A, the distributed resource-distribution system 1602 has been allocated resources that shown as shaded portions of the resources of distributed computer systems 1606, 1608, and 1609-1610. The distributed resource-distribution system 1602 executes, in distributed fashion, on all four of the distributed computing systems 1606, 1608, and 1609-1610. In general, the distributed resource-distribution system 1602 acquires significant amounts of resources from distributed computing system 1606 and 1608 and makes those resources available to users of distributed computing system 1609 and 1610. For example, distributed computing system 1609 may be owned by a first organization that may need to temporarily expand its computational resources. In order to do so, the first organization leases computational resources through the distributed resource-distribution system 1602 that the distributed resource-distribution system, in turn, has temporarily acquired from distributed computing system 1606 and 1608.

Figure 16B:
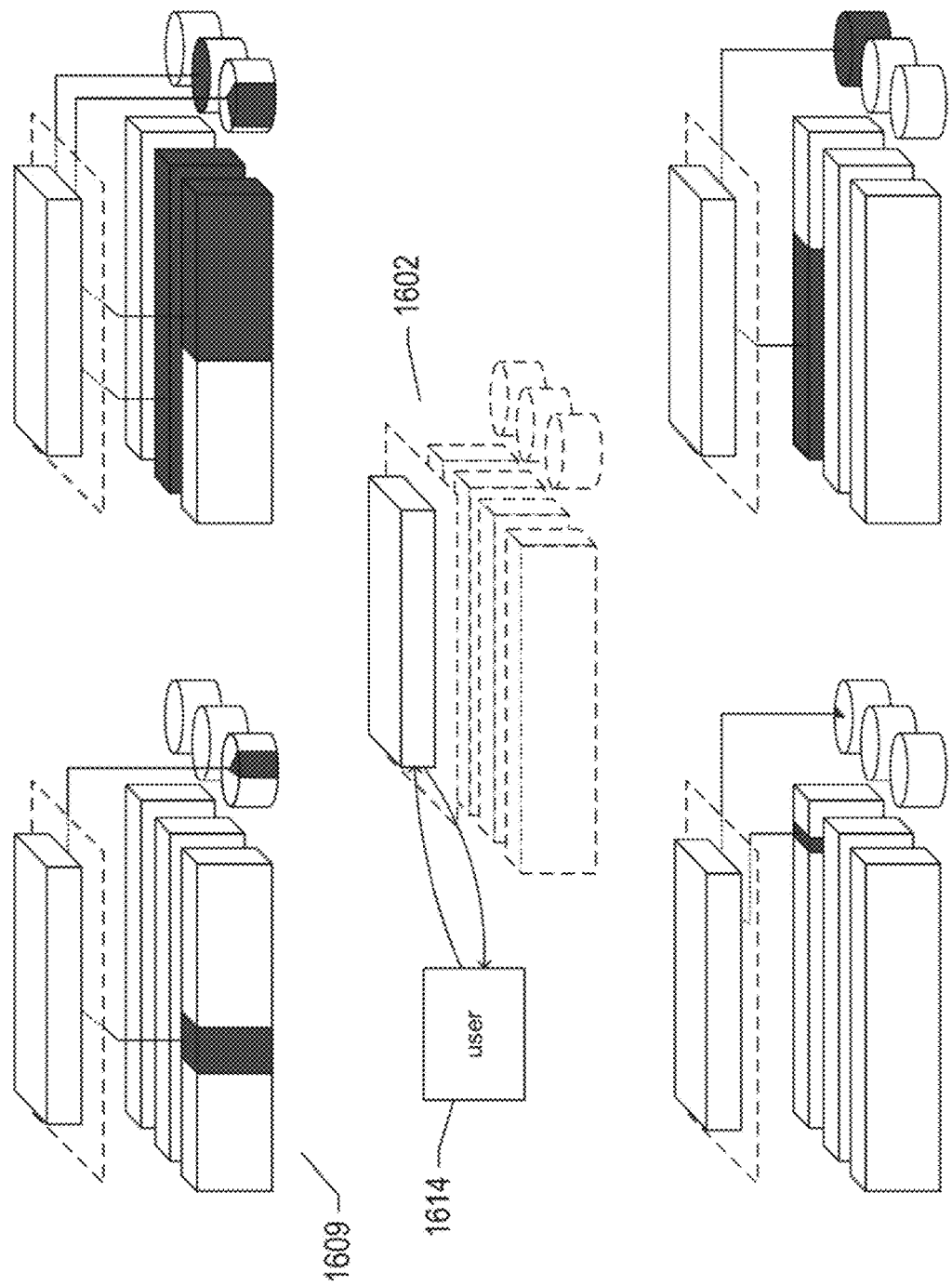
Figure 16C:
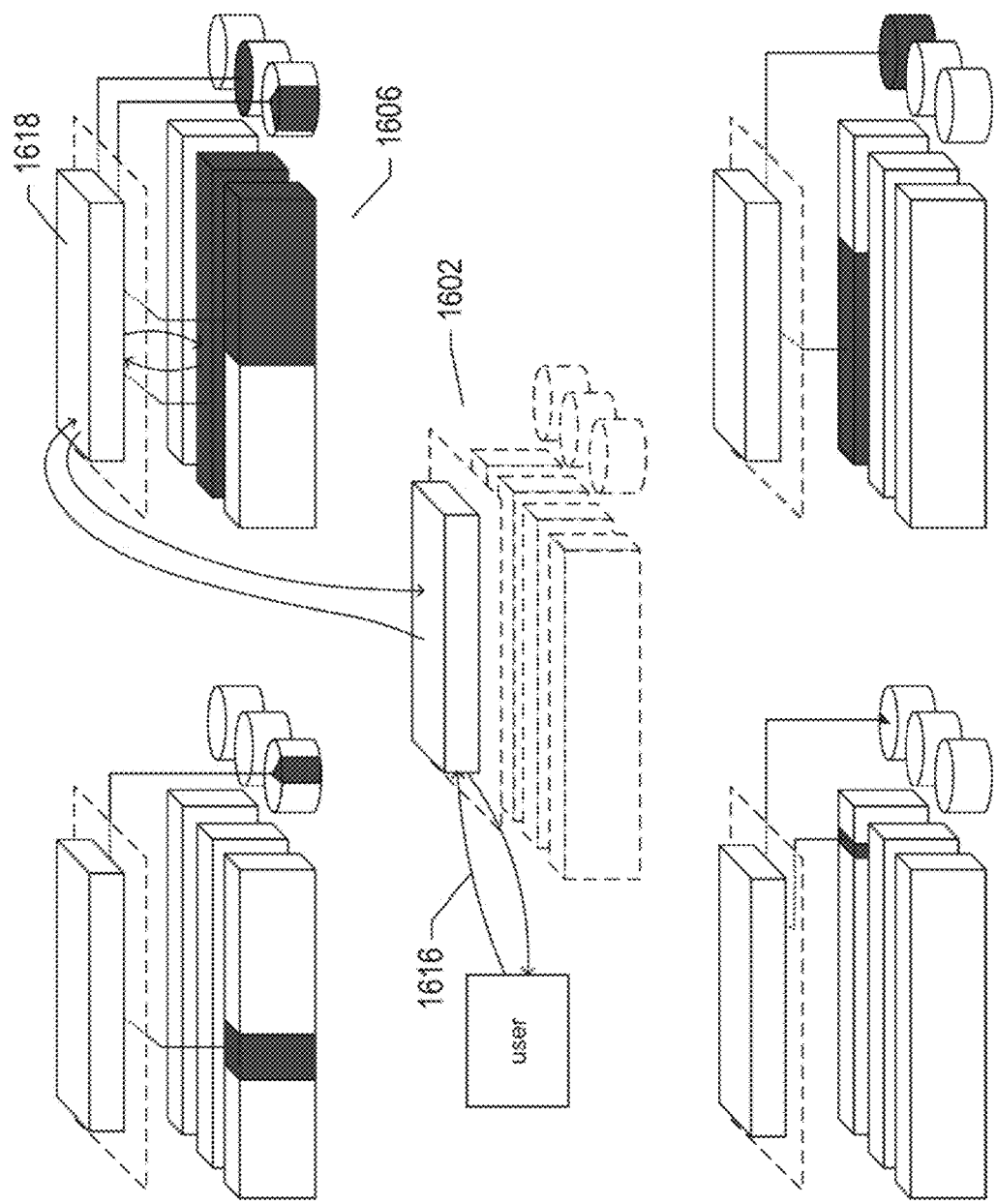

In FIG. 16B, a user 1614, such as an organization that owns and manages distributed computer system 1609, registers with the distributed resource-distribution system 1602 in order to be able to subsequently temporarily acquire additional computational resources. When, as shown in FIG. 16C, the user attempts to obtain and use additional computational resources, as indicated by arrow 1616, from the distributed resource-distribution system 1602, the distributed resource-distribution system attempts to establish access to the resources desired by the user within the distributed computer system 1606 via system interface 1618. However, access to the resources requires a local identity within distributed computer system 1606. In one model, the distributed resource-distribution system may have previously registered with distributed computer system 1606 to obtain a local identity within distributed computer system 1606 and may use that local identity on behalf of the user so that the user can access the computational resources in distributed computer system 1606 that the user leases from the distributed resource-distribution system 1602. However, this model is associated with numerous problems. A major problem is that, when a distributed-resource-distribution-system local identity is used by a user to access resources within distributed computer system 1606 on behalf of many different users of the distributed resource-distribution system, distributed computer system 1606 is unable to determine which user actually accessed computational resources within distributed computer system 1606 through the distributed resource-distribution system, since the access appears to have been made by the distributed-resource-distribution-system with which the local identity is associated Such information may be needed for purposes of auditing, monitoring, and reporting computational-resource access. As one example, if it is later discovered that one of the distributed-resource-distribution-system users has been using computational resources of distributed computer system 1606 for illegal purposes, distributed computer system 1606 may be legally required to identify the user involved in the illegal activities. However, since the user involved in illegal activities accessed the computational resources of distributed computer system 1606 via a local identity associated with the distributed resource-distribution system, distributed computing system 1606 cannot identify that user. Furthermore, the distributed resource-distribution system also cannot generally identify the user, since the distributed resource-distribution system essentially establishes the ability of users to access remote computational resources using distributed-resource-distribution-system-associated local identities within the remote distributed computer systems in which the computational resources are physically located, but does not and cannot monitor ongoing access to these resources by the users.

Figure 16D:
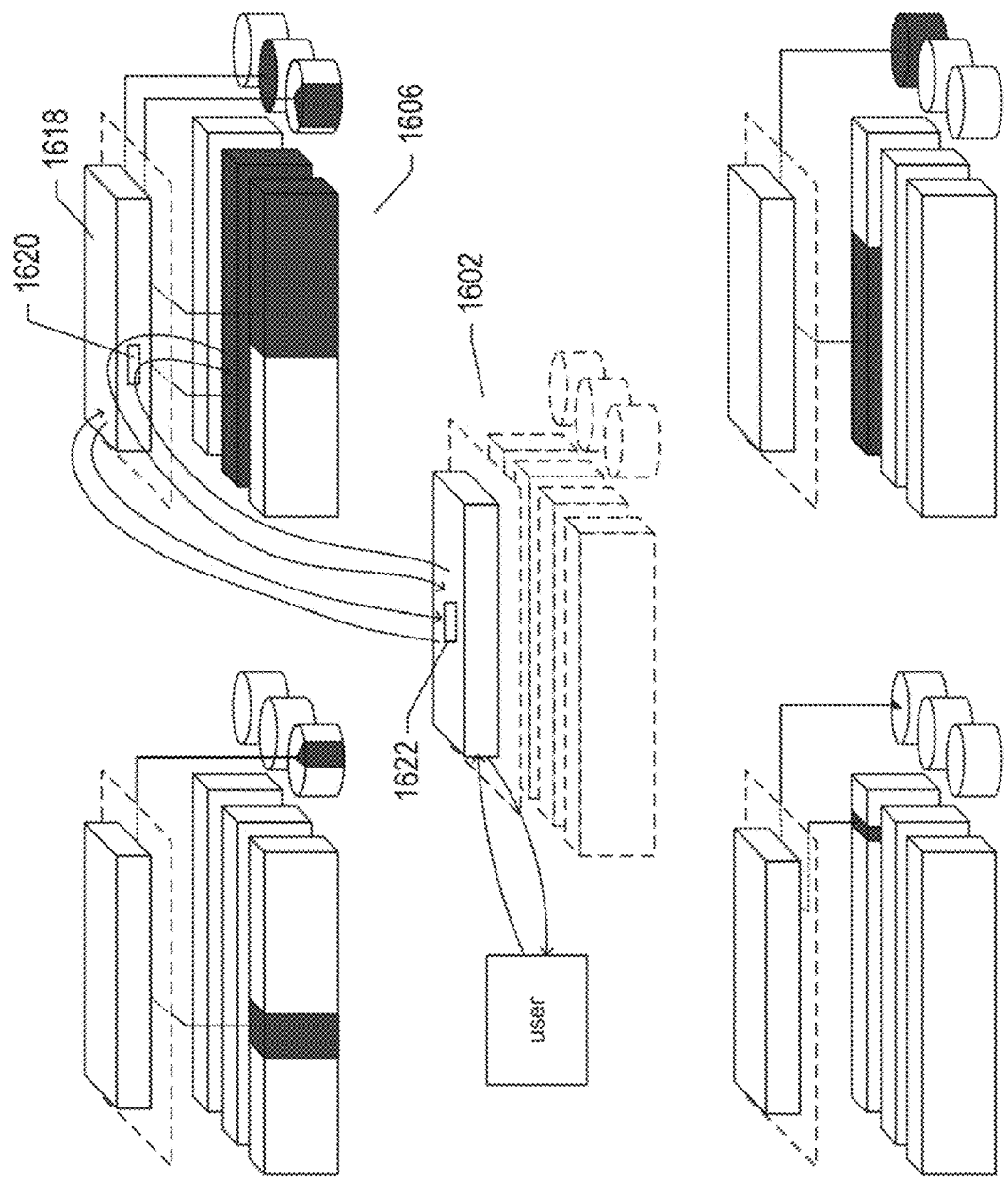

FIG. 16D illustrates establishment, by a distributed reverse federated identity-management system incorporated within, or invoked by, the distributed resource-distribution system, of a local proxy identity for the user. When the distributed reverse federated identity-management system is available, and the user attempts to access computational resources within distributed computing system 1606 via the distributed resource-distribution system 1602, the distributed reverse federated identity-management system establishes, via system interface 1618, a local proxy identity 1620 within the distributed computer system 1606 that is associated with the user. A credential for this local proxy identity 1618 is returned by system interface to the distributed resource-distribution system 1622 to facilitate access, by the user, to computational resources and distributed computer system 1606. The distributed-resource-distribution system then establishes a more or less direct communications route between the user and the distributed computer system 1606, based on the local proxy identity 1622, that allows the user to access computational resources obtained via the distributed resource-distribution system within the distributed computer system 1606. The distributed reverse federated identity-management system establishes a one-to-one mapping, or exclusive relationship, between each user of the distributed resource-distribution system and those remote distributed computing systems providing computational resources through the distributed resource-distribution system to the user via local proxy identities established within the distributed computing systems. This allows the distributed computing systems to track and monitor access to resources on a per-user basis. The distributed reverse federated identity-management system maintains a detailed mapping of users' identities to local proxy identities within the distributed computing systems so that, in the event that the users' identities need to be revealed, for auditing and/or monitoring purposes, the users' identities can be provided by the distributed reverse federated identity-management system.

In many cases, users may wish to remain anonymous to the distributed computer systems that provide them computational resources through distributed resource-distribution systems and, in many cases, distributed computer systems that provide computational resources through distributed resource-distribution systems to users of the distributed resource-distribution systems may wish to remain anonymous to the users. The establishment, by a distributed reverse federated identity-management system incorporated within, or invoked by, a distributed resource-distribution system, of local proxy identities for users and maintenance of a one-to-one mapping, or exclusive relationship, between each user of the distributed resource-distribution system and those remote distributed computing systems providing computational resources through the distributed resource-distribution system to the user via local proxy identities provides a level of indirection that allows for two-way anonymity between users and the remote distributed computing systems providing computational resources through the distributed resource-distribution system to the user.

Figure 16E:
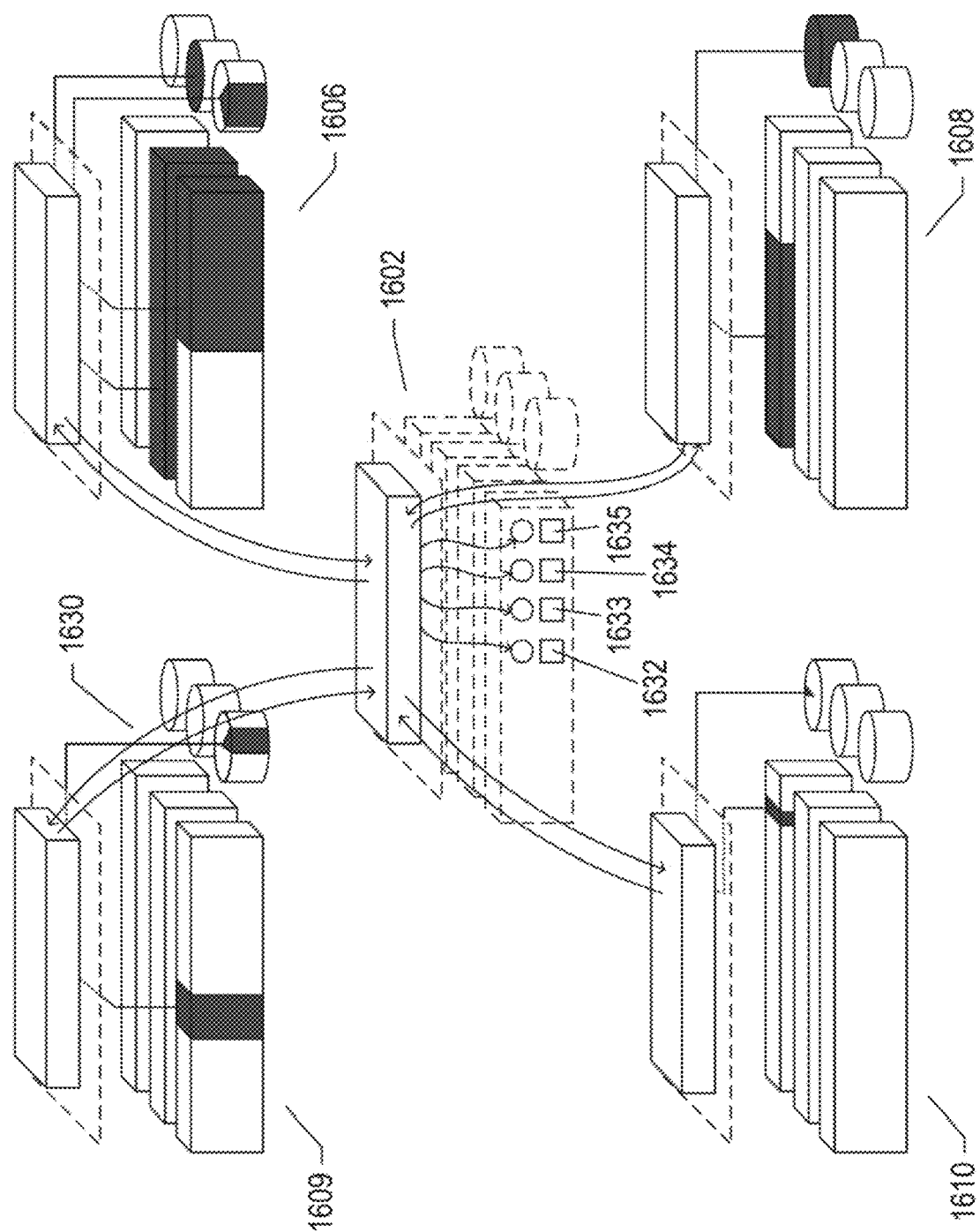

FIG. 16E illustrates the distributed reverse federated identity-management system in the context of the distributed resource-distribution system and multiple distributed computing systems discussed above with reference to FIG. 16A-D. As indicated by the pairs of arrows, such as the pair of arrows 1630, the distributed reverse federated identity-management system incorporated within, or accessed by, the distributed resource-distribution system 1602 provisions local proxy identities within each of the distributed computer systems 1606, 1608, and 1609-1610. The local proxy identities, along with a detailed log that includes entries representing the mapping between distributed-resource-distribution-system users and local proxy identities, are maintained by the distributed reverse federated identity-management system for each remote distributed computing system 1632-1635. In one implementation, the local proxy identities are maintained in pools for each remote distributed computing system. The pools can be increased, in size, by provisioning of additional local proxy identities and can be decreased, and size, by terminating local proxy identities. The logs are maintained to provide detailed mappings, over time, of distributed-resource-distribution-system users to local proxy identities within the distributed computing systems, thus allowing for various types of auditing and monitoring to be carried out by the distributed computing systems on a per-user basis, with actual user identities available from the distributed reverse federated identity-management system for any given period of time, as further discussed below. The distributed reverse federated identity-management system can initially provision and subsequently reconfigure local proxy identities to have the set of authorizations needed for user access to computational resources according to any particular type of lease or agreement made between a user and the distributed resource-distribution system. Thus, not only does the distributed reverse federated identity-management system automatically maintain detailed mappings between users of the distributed resource-distribution system and a local proxy identities, the distributed reverse federated identity-management system also automatically establishes the sets of authorizations associated with local proxy identities needed for particular types of leases and other temporary transfer of control over computational resources from the remote distributed computing systems to users of the distributed resource-distribution system.

Figure 17:
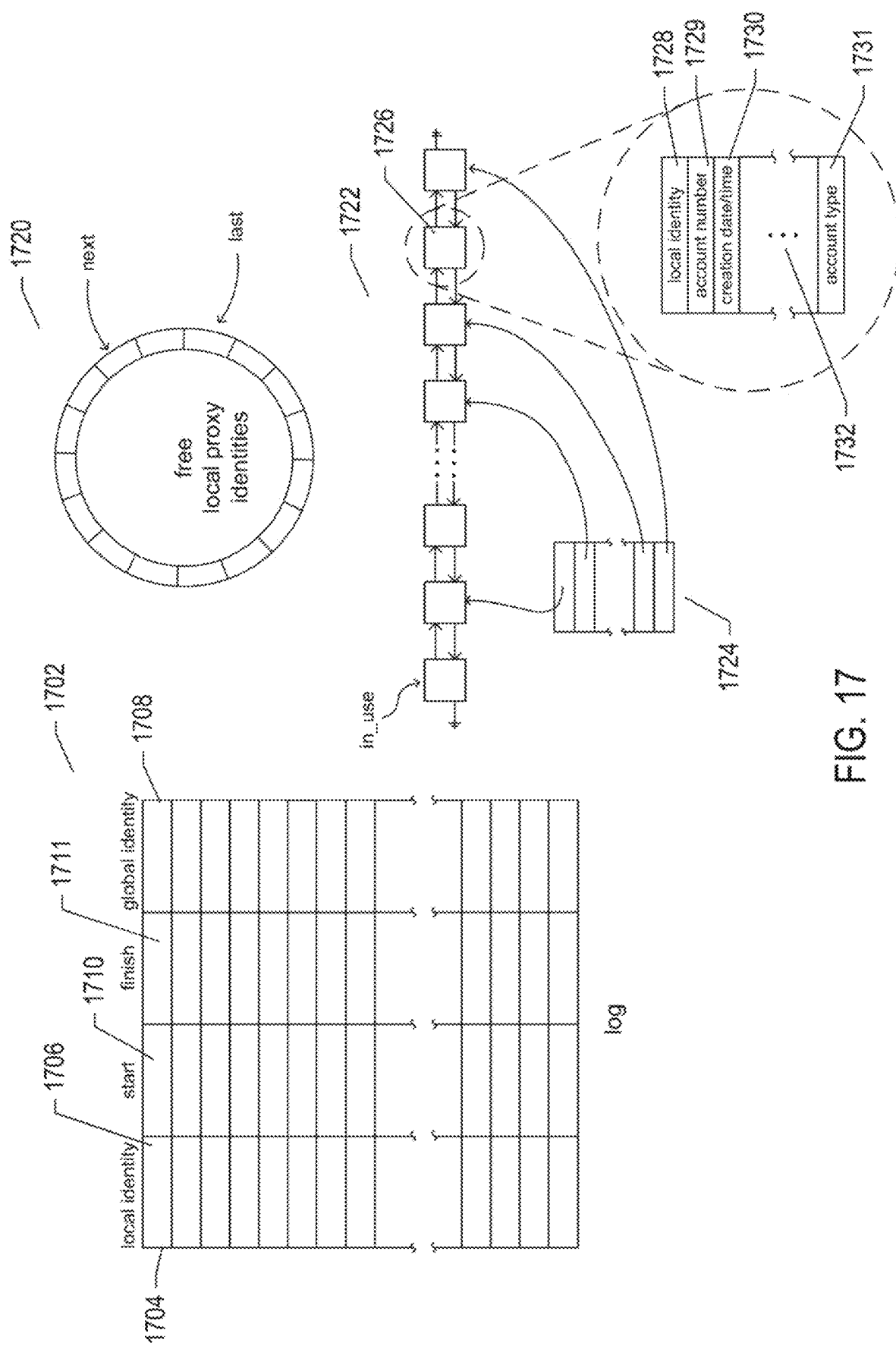
FIG. 17 illustrates the log containing a map between users and local proxy identities and the pool of local proxy identities maintained by one implementation of a distributed reverse federated identity-management system for each remote distributed computing system from which computational resources are allocated by a distributed resource-distribution system for distribution to users of the distributed resource-distribution system.

FIG. 17 illustrates the log containing a map between users and local proxy identities and the pool of local proxy identities maintained by one implementation of a distributed reverse federated identity-management system for each remote distributed computing system from which computational resources are allocated by a distributed resource-distribution system for distribution to users of the distributed resource-distribution system. It should be noted that there are a variety of different possible implementations of distributed reverse federated identity-management systems. In the distributed reverse federated identity-management system discussed with reference to FIG. 17 and to FIGS. 18A-G, the distributed reverse federated identity-management system maintains a pool of local proxy identities that can be reused, over time, for successive users of a distributed resource-distribution system. In other implementations, a distributed reverse federated identity-management system newly provisions local proxy identities for each user, without reusing provisioned local proxy identities.

The log 1702 is a continuously updated map of local proxy identities to users of a distributed resource-distribution system that employs or incorporates a distributed reverse federated identity-management system. In the currently described implementation, each user is associated with a global identity created by the distributed resource-distribution system in cooperation with the distributed reverse federated identity-management system that the distributed resource-distribution system incorporates or invokes. The global identities are not shared with remote distributed computing systems, in general, but may be revealed for various types of auditing or monitoring purposes, often to a third-party organization or governmental agency. Each entry in the log, represented by a row in FIG. 17, such as the first row 1704, includes a local proxy identity 1706, the global identity 1708 for the user using the local proxy identity to access computational resources in a remote distributed computer system, and a start and finish date/time

1710-1711. Thus, each entry corresponds to a mapping, for a definite period of time, of a user to a local proxy identity. The log may be implemented in various different ways, including as an aggregate of files or distributed files, as a database table, as a more complex indexed distributed file, and in many other ways. A circular buffer 1720 stores entries that correspond to local proxy identities that have been provisioned by the distributed reverse federated identity-management system and that are currently unassociated with users. This circular buffer is a pool of available local proxy identities. An in_use doubly linked list 1722 contains entries representing local proxy identities provisioned by the distributed reverse federated identity-management system that are currently associated with, and used by, users. The doubly linked list may be associated with an index 1724 to facilitate rapid searching of the doubly-linked list for particular local proxy identities. Each entry in the doubly linked list, such as entry 1726, may include an indication of the particular local identity 1728, and account number 1729, a date/time when the local proxy identity was created 1730, an account type 1731, and any of many additional types of information, as represented by ellipses 1732. The distributed reverse federated identity-management system, in the described implementation, maintains a log and local-proxy-identity pool for each remote distributed computer system from which local proxy identities are provisioned on behalf of users of a distributed-resource-distribution system that evokes or incorporates the distributed reverse federated identity-management system. When the distributed reverse federated identity-management system provides automated local-proxy-identity provisioning and logging for multiple distributed resource-distribution systems, the reverse federated identity-management system creates and maintains separate sets of logs and local-proxy-identity pools for each distributed resource-distribution system, in one implementation. In alternate implementations, entries in fields within the logs and local-proxy-identity pools may include fields identifying the distributed resource-distribution system associated with the user/local-proxy-identity.

Figure 18A:
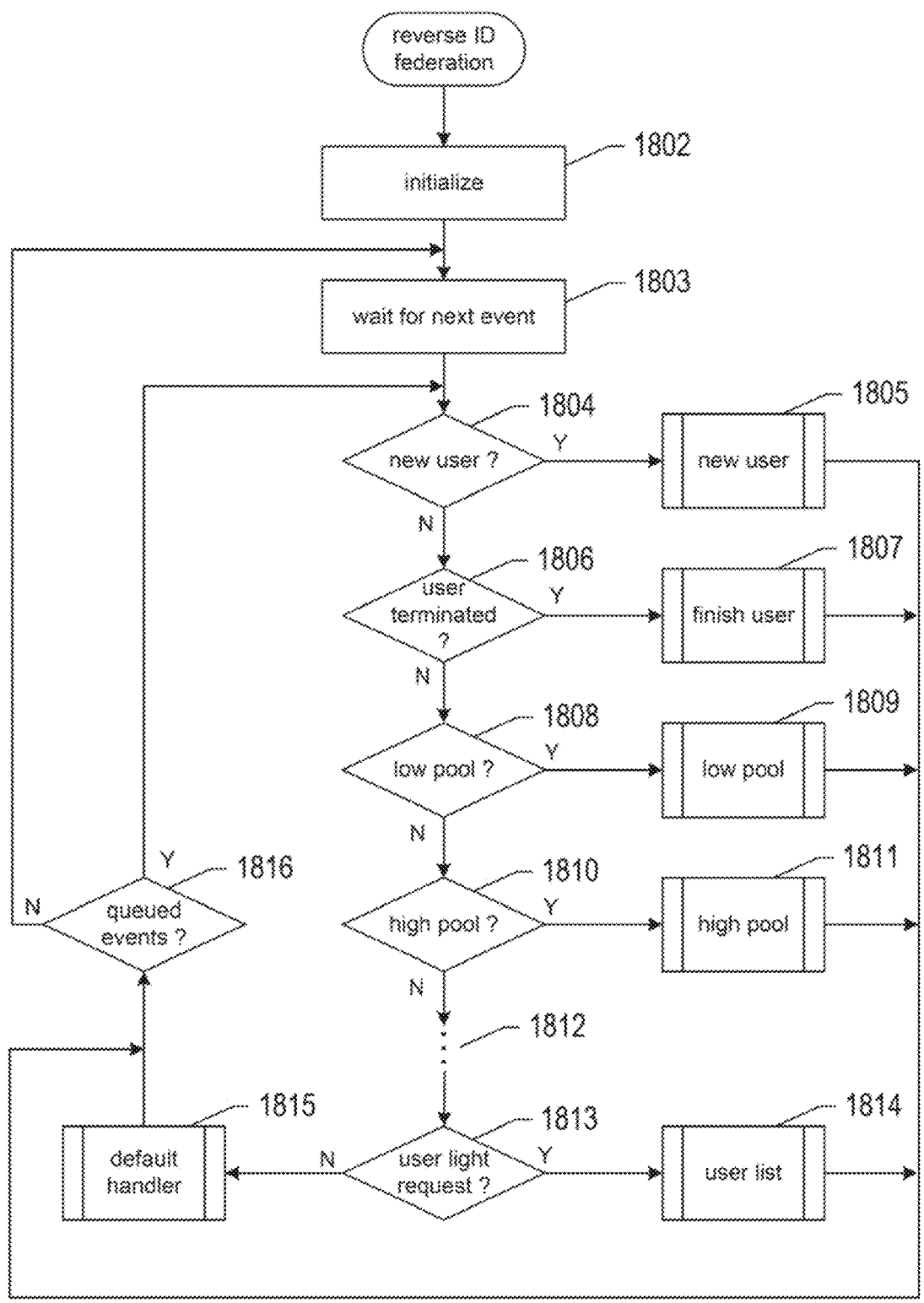
FIGS. 18A-G provide control-flow diagrams that illustrate operation of a currently described implementation of the currently disclosed distributed reverse federated identity-management systems.

FIGS. 18A-G provide control-flow diagrams that illustrate operation of a currently described implementation of the currently disclosed distributed reverse federated identity-management systems. FIG. 18A shows an event loop that underlies an implementation of the distributed reverse federated identity-management system. In step 1802, a routine "initialize" is called to initialize the logs and local-proxy-identity pools for each remote distributed computing system from which local proxy identities are provisioned. In step 1803, the event loop waits for a next event to occur. When a new-user event occurs, as determined in step 1804, a handler "new user" is called, in step 1805 to associate the user with a local proxy identity for a particular remote distributed computing system. When a user-terminated event occurs, as determined in step 1806, a "finish user" handler is called, in step 1807, to terminate an indicated association of a user with a local proxy identity. When a low-pool event occurs, as determined in step 1808, a "low pool" handler is called, in step 1809, to provision additional local proxy identities within a particular remote distributed computing system. In a high-pool event occurs, as determined in step 1810, a handler "high pool" is called, in step 1811, to deprovision or terminate a sufficient number of local proxy identities for a particular remote distributed computing system, when possible, and to otherwise increase the size of the circular buffer (1720 in FIG. 17). Ellipses 1812 indicate that additional types of events may be handled in various different implementations of a distributed reverse federated identity-management system. When a user-list-request event has occurred, as determined in step 1813, a handler "user list" is called, in step 1814, to return a mapping between users and a local proxy identity for a particular remote distributed computing system. A default handler 1815 handles rare and unexpected events. When there are additional events that have been queued for handling, as determined in step 1816, control returns to step 1804. Otherwise, control returns to step 1803, where the event loop waits for a next event to occur.

Figure 18B:
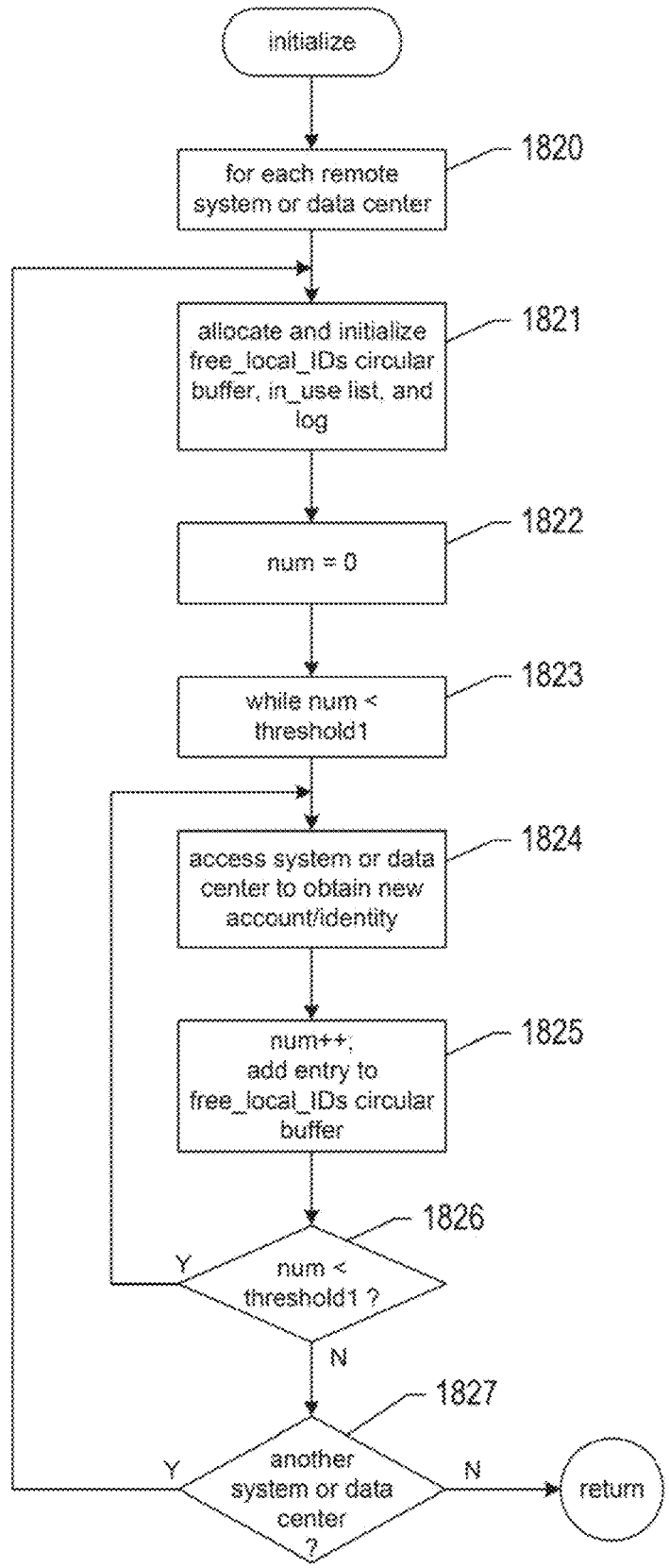

FIG. 18B provides a control-flow diagram for the routine "initialize," called in step 1802 of FIG. 18A. In each iteration of the for-loop of steps 1820-1827, a log and local-proxy-identity pool is allocated and initialized for each remote distributed system or data center from which local proxy identities are provisioned by the distributed reverse federated identity-management system. In step 1821, a circular buffer, in_use list, and log are allocated and initialized. In step 1822, the local variable num is initialized to the value 0. In the while-loop of steps 1823-1826, while the local variable num is less than a first threshold value, a next local proxy identity is provisioned, in step 1824, from the currently considered remote system or data center and, in step 1825, the local variable num is incremented and an entry for the newly provisioned local proxy identity was added to the circular buffer.

Figure 18C:
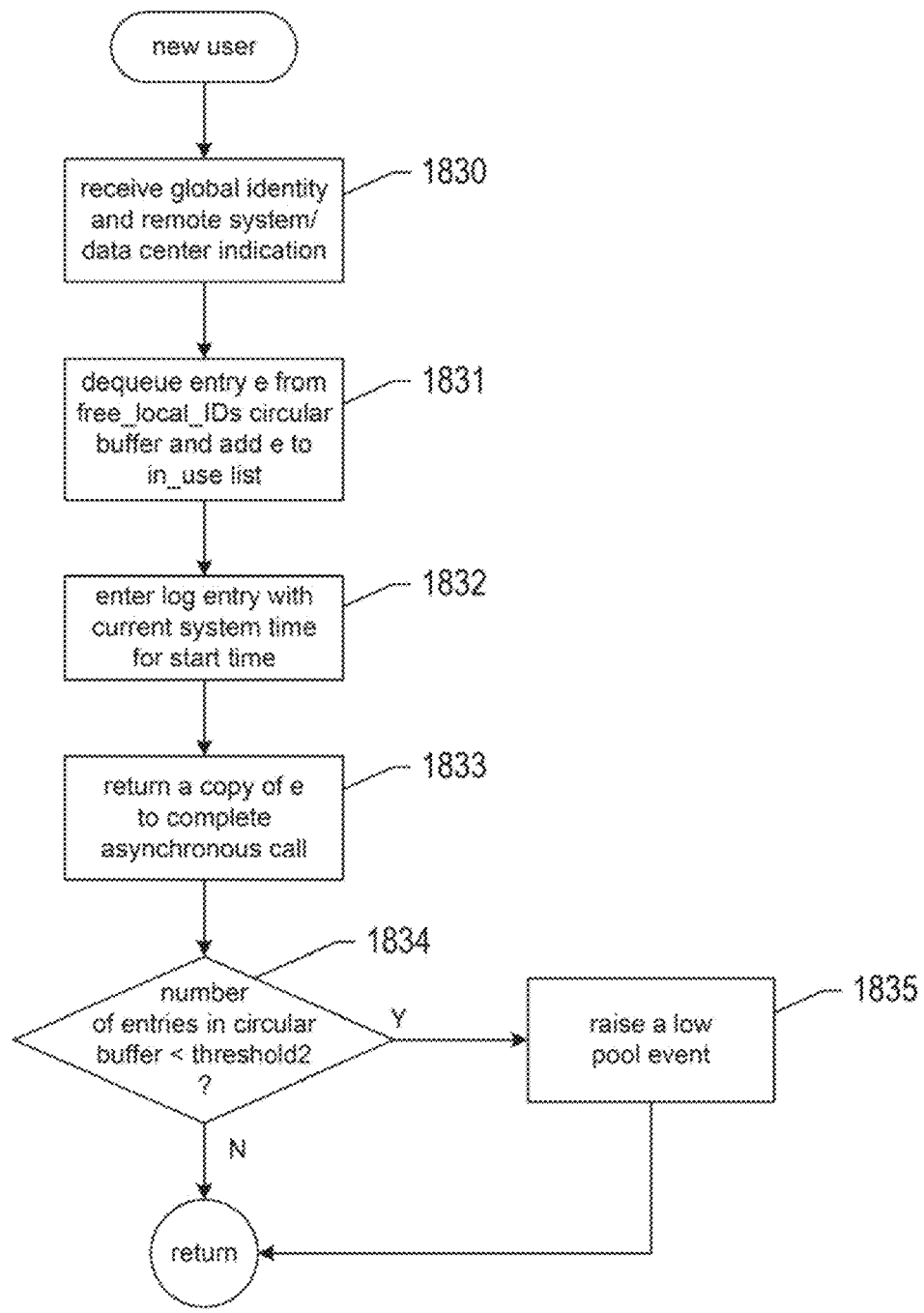

FIG. 18C provides a control-flow diagram for the handler "new user," called in step 1805 of FIG. 18A. The new-user event that triggers a call to the handler "new user" from the event loop illustrated in FIG. 18A arises when a local proxy identity is requested for a user by a distributed resource-distribution system. In step 1830, the global identity and an indication of the remote system or data center within which a local proxy identity is needed for the user are received. The global identity is found or created by the distributed reverse federated identity-management system prior to generation of a new-user event. In step 1831, an entry e is dequeued from the circular buffer and, following the appropriate modification, added to the in_use doubly linked list. The entry is modified to indicate the user to which the local proxy identity represented by the entry is being associated. Furthermore, as mentioned above, the distributed reverse federated identity-management system may need to access system services within the remote distributed computer system to modify the authorizations associated with local proxy identity so that they are compatible with the types of access needed by the user. In step 1832, a new log entry is entered into the log to represent the association of the user with the local proxy identity, with the start time set to the current system time and the finish time left in a recognizably uninitialized state. In step 1833, all or a portion of the entry e is returned to a caller, such as a distributed resource-distribution system, to complete an asynchronous call seeking a local proxy identity for the user represented by the received global identity. When the number of entries in the circular buffer is less than a second threshold value, as determined in step 1834, the handler "new user" raises a low-pool event, in step 1835.

Figure 18D:
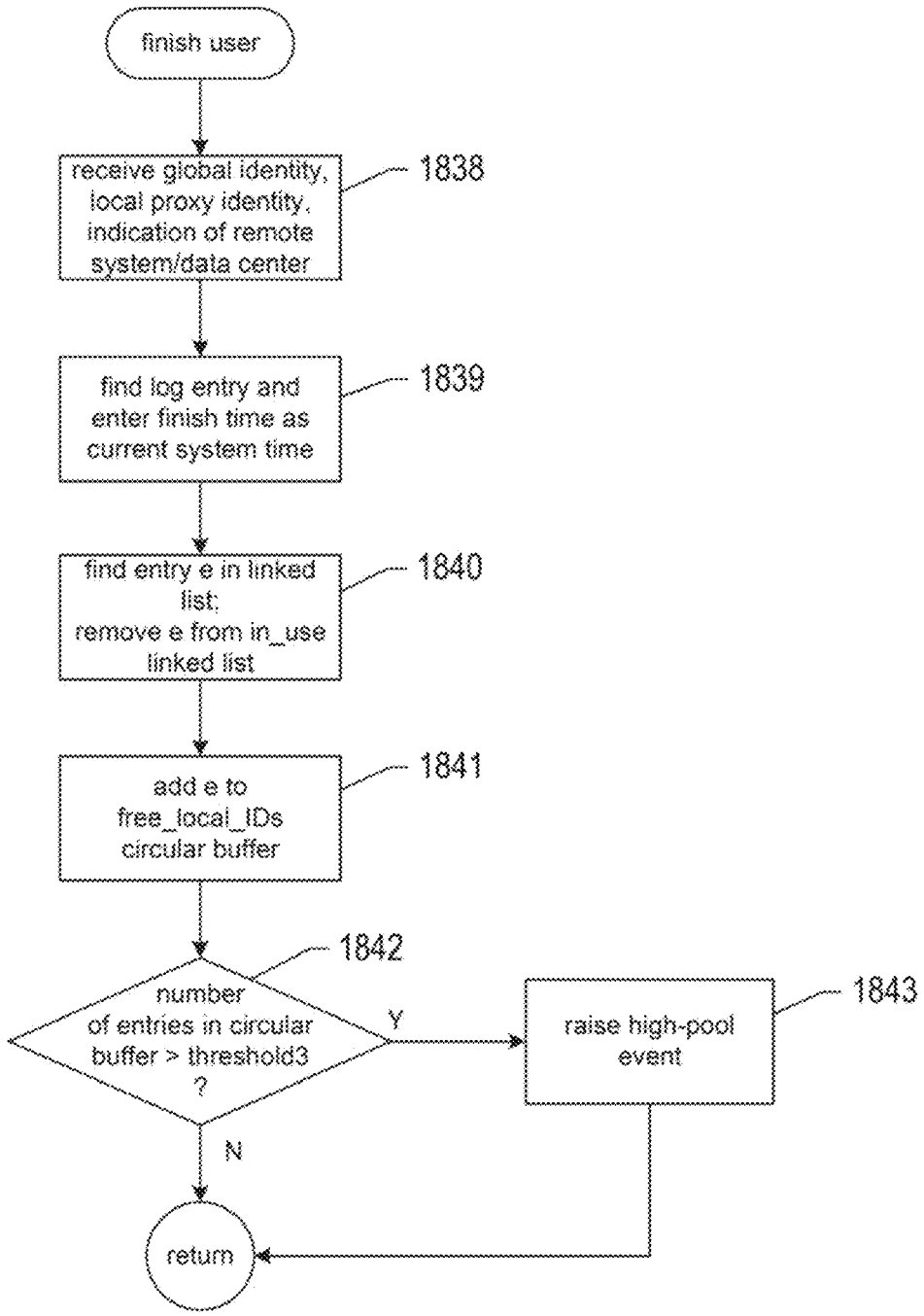

FIG. 18D provides a control-flow diagram for the handler "finish user," called in step 1807 of FIG. 18A. The finish-user event that triggers a call to the handler "finish user" from the event loop illustrated in FIG. 18A arises when a user has finished using and accessing one or more computational resources provided by a distributed computer system and therefore no longer needs or uses a local proxy identity associated with the user by the distributed reverse federated identity-management system. In step 1838, a global identity, a local proxy identity, and indications of the remote system or data center from which the local proxy identity has been provisioned are received. In step 1839, the handler "finish user" finds the log entry corresponding to the received global identity and local proxy identity and enters, as the finish time, the current system time. In step 1840, the handler finds an entry e in the doubly linked list corresponding to the local proxy identity and removes entry e from the in_use doubly linked list. In step 1841, the entry e is added to the circular buffer. When the number of entries in the circular buffer is greater than a third threshold, as determined in step 1842, the handler raises a high-pool event in step 1843.

Figure 18E:
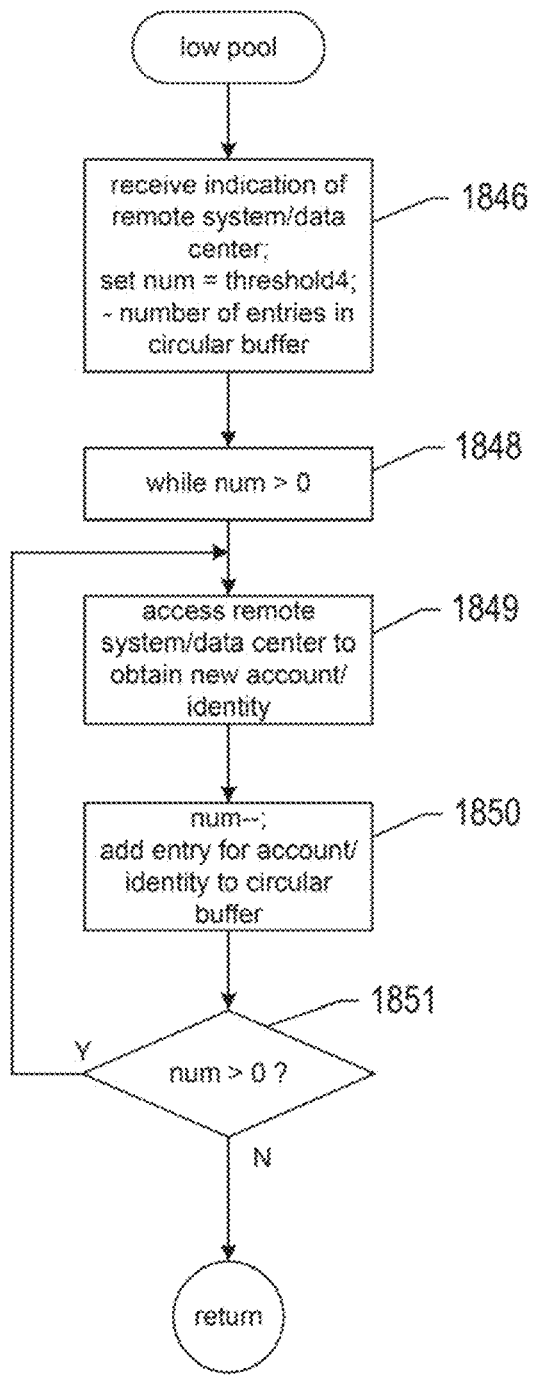

FIG. 18E provides a control-flow diagram for the handler "low pool," called in step 1809 of FIG. 18A. In step 1846, the low-pool handler receives an indication of a remote system or data center and sets the local variable num to a value equal to a fourth threshold minus the number of entries currently in the circular buffer. In the while-loop of steps 1848-1851, the low-pool handler iteratively accesses the system interface of the remote system or data center to provision a new local proxy identity, in step 1849, decrements the local variable num and, in step 1850, adds an entry for the newly provisioned identity to the circular buffer until the value in the local variable num falls to 0.

Figure 18F:
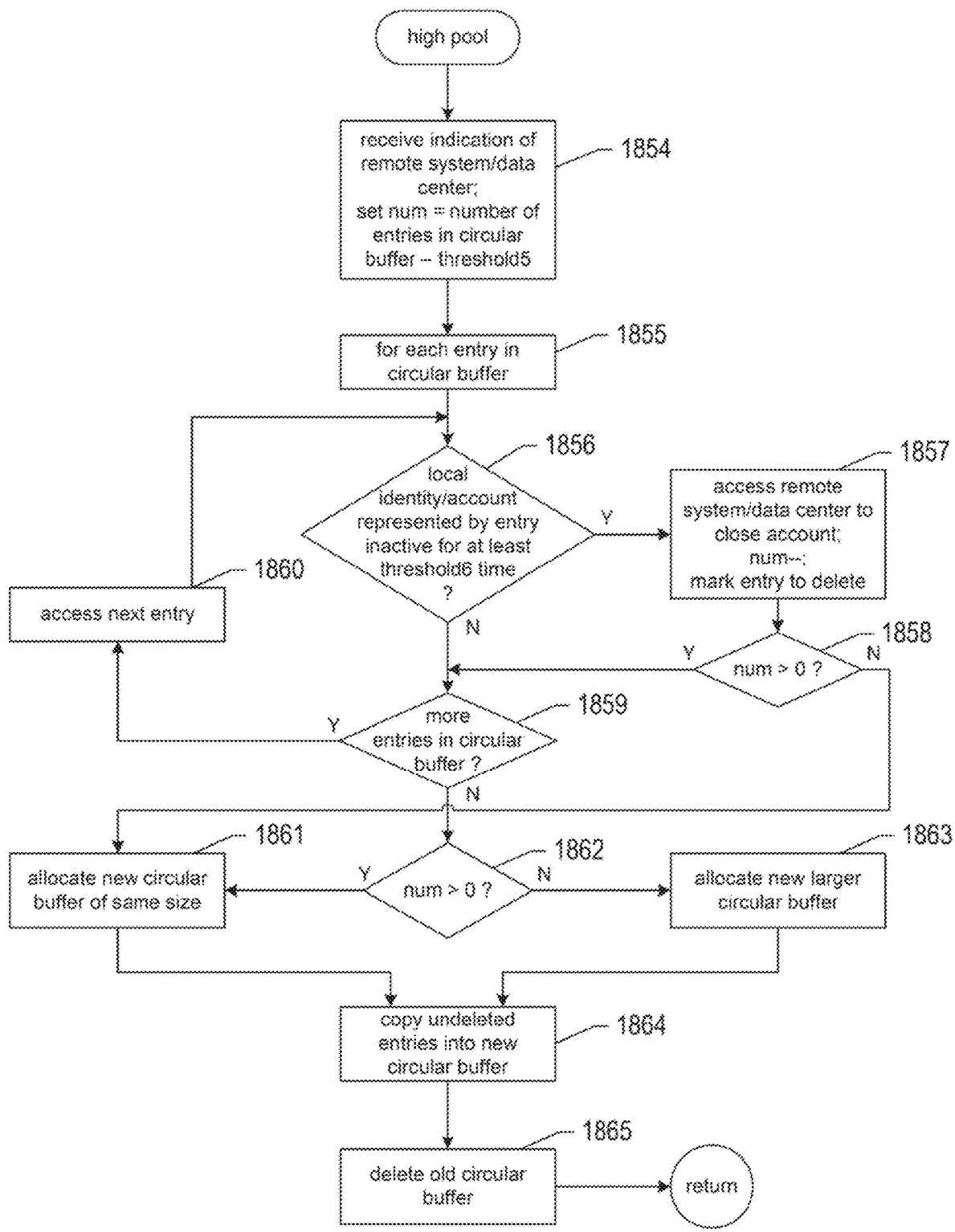

FIG. 18F provides a control-flow diagram for the handler "high pool," called in step 1811 of FIG. 18A. In step 1854, the high-pool handler receives an indication of a remote system or data center and sets a local variable num to the number of entries in the circular buffer minus a fifth threshold value. Then, in the for-loop of steps 1855-1860, each entry in the circular buffer is considered. When the local proxy identity, or account, represented by the entry has been inactive for at least an amount of time equal to a sixth threshold, as determined in step 1856, a service of the remote system or data center is accessed through the system interface of the remote system or data center to close the account or terminate the local proxy identity, after which the local variable num is decremented and the entry is marked for deletion, in step 1857. When the value in the local variable num has fallen to 0, as determined in step 1858, the for-loop of steps 1855-1860 is exited and control flows to step 1861, discussed below. Otherwise, when the entry has not been inactive for a threshold amount of time or when there are more entries in the circular buffer, as determined in step 1859, the next entry in the circular buffer is accessed, in step 1860, in preparation for a next iteration of the for-loop of steps 1855-1860. Following completion of the for-loop of steps 1855-1860, when the value in the local variable num is greater than 0, as determined in step 1862, a new larger circular buffer is allocated in step 1863. Otherwise, a new circular buffer the same size as the old circular buffer is allocated in step 1861. In step 1864, those entries that are not marked for deletion in the old circular buffer are copied to the new circular buffer and, in step 1865, the old circular buffer is deleted.

Figure 18G:
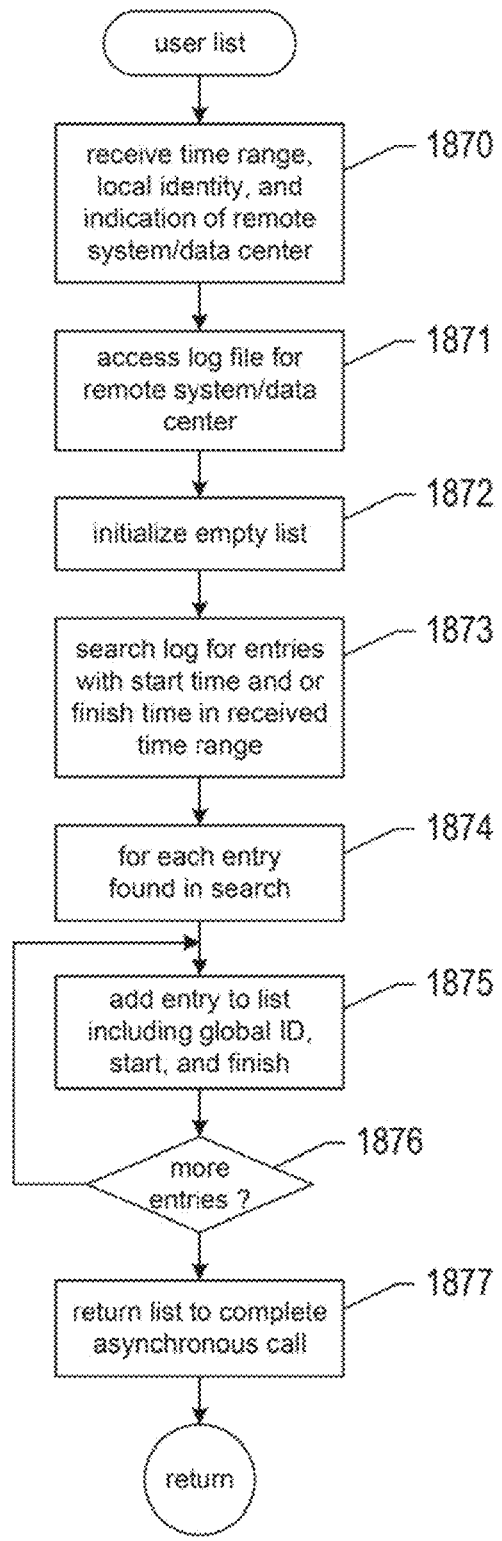

FIG. 18G provides a control-flow diagram for the routine "user list," called in step 1814 of FIG. 18A. In step 1870, the routine "user list" receives a time range, generally an initial date/time and a final date/time, a local proxy identity, and an indication of a remote system or data center. In step 1871, the user-list routine accesses the log file for the indicated remote system or data center. In step 1872, the user-list routine initializes an empty list for return to a calling entity. In step 1873, the user-list routine searches the log for entries with a start and/or finish time within the received time range. Then, in the for-loop of steps 1874-1876, each of the entries identified by the search, in step 1873, is added to the list, with the entries in the list including at least a global identity, start time, and finish time of the corresponding log entry. Finally, in step 1877, the list populated in the for-loop of steps 1874-1876 is returned to a calling entity to complete the asynchronous call. This list allows the distributed reverse federated identity-management system to identify the users corresponding to local proxy identities within a remote distributed computer system for auditing, monitoring, or other activities for which the user identities are needed.

The present invention has been described in terms of particular embodiments, it is not intended that the invention be limited to these embodiments. Modifications within the spirit of the invention will be apparent to those skilled in the art. For example, any of many different implementations can be obtained by varying various design and implementation parameters, including modular organization, control structures, data structures, hardware, operating system, and virtualization layers, and other such design and implementation parameters. A distributed reverse federated identity-management system may provide many facilities and services in addition to automated association of the local proxy identities to users and automated configuration of the authorizations associated with the local proxy identities. As discussed above, any of many different types of system interfaces can be accessed to provide any of many different types of local proxy identities within remote distributed computing systems. A distributed reverse federated identity-management system may contain sophisticated logic for identifying the types of authorizations in a given remote distributed computing system needed for a particular user of a distributed-resource-distribution system that invokes or incorporates the distributed reverse federated identity-management system.

What is claimed is:

1. A distributed reverse federated identity-management system comprising:
    one or more memories within one or more computer systems that store, for each distributed computer system from which resources are allocated by a distributed resource-distribution system, a log that maps local proxy identities to users of the distributed resource-distribution system;
    one or more memories within one or more computer systems that store information about local proxy identities created within multiple distributed computer systems from which resources are allocated by the distributed resource-distribution system;
    one or more memories within multiple computer systems that store instructions that, when executed by one or more processors within the multiple computer systems, control the multiple computer systems to implement the distributed reverse federated identity-management system by
        generating global identities for users of the distributed resource-distribution system;
        provisioning local proxy identities within distributed computer systems from which resources are allocated by a distributed resource-distribution system on behalf of the users;
        associating a local proxy identity with each user within each distributed computer system from which resources are allocated by the distributed resource-distribution system on behalf of the user; and
        generating and storing a log entry that represents an association between a user of the distributed resource-distribution system and a local proxy identity for each local proxy identity associated with a user.

2. The distributed reverse federated identity-management system of claim 1 wherein, when the distributed resource-distribution system distributes computational resources from a set of one or more distributed computer systems to a user, the distributed reverse federated identity-management system provisions local proxy identities for the user from each distributed computer system in the set of one or more distributed computer systems, each local proxy identity associated with a set of authorizations needed for the user to access the computational resources distributed to the user from the distributed computer system from which the local proxy identity is provisioned.

3. The distributed reverse federated identity-management system of claim 1 wherein, when the distributed resource-distribution system terminates use, by a user, of computational resources distributed by the distributed resource-distribution system to the user from a set of one or more distributed computer systems, the distributed reverse federated identity-management system terminates local proxy identities provisioned for the user within each distributed computer system in the set of one or more distributed computer systems.

4. The distributed reverse federated identity-management system of claim 1 wherein, when the distributed resource-distribution system distributes computational resources from a set of one or more distributed computer systems to a user, the distributed reverse federated identity-management system
   selects, for each distributed computer system in the set of one or more distributed computer systems, an already provisioned local proxy identity from a pool of local proxy identities within the distributed computer system for the user, and
   reconfigures the authorizations associated with the selected local proxy identities, as needed, to allow the user to access the computational resources distributed to the user from the distributed computer systems using the selected local proxy identities.

5. The distributed reverse federated identity-management system of claim 4 wherein, when the distributed resource-distribution system terminates use, by a user, of computational resources distributed by the distributed resource-distribution system to the user from a set of one or more distributed computer systems, the distributed reverse federated identity-management system returns the local proxy identities selected for the user to the pools of local proxy identities for the one or more distributed computer systems.

6. The distributed reverse federated identity-management system of claim 1
   wherein the distributed reverse federated identity-management system returns information about each local proxy identity selected or provisioned for a user of the distributed resource-distribution system to the distributed resource-distribution system; and
   wherein the distributed resource-distribution system uses the returned information to establish access by the user to the computational resources allocated from the distributed computer systems within which the local proxy identities are provisioned.

7. The distributed reverse federated identity-management system of claim 1 wherein each log entry includes:
   a user's global identity established by the distributed reverse federated identity-management system for the distributed resource-distribution system;
   a start time;
   a finish time; and
   an indication of a local proxy identifier.

8. The distributed reverse federated identity-management system of claim 7 wherein, upon a request for user identities corresponding to a local proxy identity over a specified time period for a distributed computer system, the distributed reverse federated identity-management system
   searches a log for the distributed computer system to identify entries for which the time period represented by the start and finish times in the entries overlaps with the specified time period; and
   returns the user identities and time period represented by the start and finish times in the identified log entries.

9. A method carried out by a distributed reverse federated identity-management system comprising:
   for each distributed computer system from which resources are allocated by a distributed resource-distribution system, generating and storing, in one or more memories within one or more computer systems, a log that maps local proxy identities to users of the distributed resource-distribution system;
   storing, in one or more memories within one or more computer systems, information about local proxy identities created within multiple distributed computer systems from which resources are allocated by the distributed resource-distribution system;
   generating global identities for users of the distributed resource-distribution system;
   provisioning local proxy identities within distributed computer systems from which resources are allocated by a distributed resource-distribution system on behalf of the users;
   associating a local proxy identity with each user within each distributed computer system from which resources are allocated by the distributed resource-distribution system on behalf of the user; and
   generating and storing, in the log, a log entry that represents an association between a user of the distributed resource-distribution system and a local proxy identity for each local proxy identity associated with a user.

10. The method of claim 9 wherein, when the distributed resource-distribution system distributes computational resources from a set of one or more distributed computer systems to a user, the distributed reverse federated identity-management system provisions local proxy identities for the user from each distributed computer system in the set of one or more distributed computer systems, each local proxy identity associated with a set of authorizations needed for the user to access the computational resources distributed to the user from the distributed computer system from which the local proxy identity is provisioned.

11. The method of claim 9 wherein, when the distributed resource-distribution system terminates use, by a user, of computational resources distributed by the distributed resource-distribution system to the user from a set of one or more distributed computer systems, the distributed reverse federated identity-management system terminates local proxy identities provisioned for the user within each distributed computer system in the set of one or more distributed computer systems.

12. The method of claim 9 wherein, when the distributed resource-distribution system distributes computational resources from a set of one or more distributed computer systems to a user, the distributed reverse federated identity-management system selects, for each distributed computer system in the set of one or more distributed computer systems, an already provisioned local proxy identity from a pool of local proxy identities within the distributed computer system for the user, and reconfigures the authorizations associated with the selected local proxy identities, as needed, to allow the user to access the computational resources distributed to the user from the distributed computer systems using the selected local proxy identities.

13. The method of claim 12 wherein, when the distributed resource-distribution system terminates use, by a user, of computational resources distributed by the distributed resource-distribution system to the user from a set of one or more distributed computer systems, the distributed reverse federated identity-management system returns the local proxy identities selected for the user to the pools of local proxy identities for the one or more distributed computer systems.

14. The method of claim 9
wherein the distributed reverse federated identity-management system returns information about each local proxy identity selected or provisioned for a user of the distributed resource-distribution system to the distributed resource-distribution system; and
wherein the distributed resource-distribution system uses the returned information to establish access by the user to the computational resources allocated from the distributed computer systems within which the local proxy identities are provisioned.

15. The method of claim 9 wherein each log entry includes:
a user's global identity established by the distributed reverse federated identity-management system for the distributed resource-distribution system;
a start time;
a finish time; and
an indication of a local proxy identifier.

16. The method of claim 15 wherein, upon a request for user identities corresponding to a local proxy identity over a specified time period for a distributed computer system, the distributed reverse federated identity-management system
searches a log for the distributed computer system to identify entries for which the time period represented by the start and finish times in the entries overlaps with the specified time period; and
returns the user identities and time period represented by the start and finish times in the identified log entries.

17. A physical data-storage device that stores computer instructions that, when carried out by a distributed reverse federated identity-management system, control the distributed reverse federated identity-management system to:
for each distributed computer system from which resources are allocated by a distributed resource-distribution system, generate and store, in one or more memories within one or more computer systems, a log that maps local proxy identities to users of the distributed resource-distribution system;
store, in one or more memories within one or more computer systems, information about local proxy identities created within multiple distributed computer systems from which resources are allocated by the distributed resource-distribution system;
generate global identities for users of the distributed resource-distribution system;
provision local proxy identities within distributed computer systems from which resources are allocated by a distributed resource-distribution system on behalf of the users;
associate a local proxy identity with each user within each distributed computer system from which resources are allocated by the distributed resource-distribution system on behalf of the user; and
generate and store, in the log, a log entry that represents an association between a user of the distributed resource-distribution system and a local proxy identity for each local proxy identity associated with a user.

18. The physical data-storage device of claim 17
wherein, when the distributed resource-distribution system distributes computational resources from a set of one or more distributed computer systems to a user, the distributed reverse federated identity-management system provisions local proxy identities for the user from each distributed computer system in the set of one or more distributed computer systems, each local proxy identity associated with a set of authorizations needed for the user to access the computational resources distributed to the user from the distributed computer system from which the local proxy identity is provisioned; and
wherein, when the distributed resource-distribution system terminates use, by a user, of computational resources distributed by the distributed resource-distribution system to the user from a set of one or more distributed computer systems, the distributed reverse federated identity-management system terminates local proxy identities provisioned for the user within each distributed computer system in the set of one or more distributed computer systems.

19. The physical data-storage device of claim 17
wherein, when the distributed resource-distribution system distributes computational resources from a set of one or more distributed computer systems to a user, the distributed reverse federated identity-management system
selects, for each distributed computer system in the set of one or more distributed computer systems, an already provisioned local proxy identity from a pool of local proxy identities within the distributed computer system for the user, and
reconfigures the authorizations associated with the selected local proxy identities, as needed, to allow the user to access the computational resources distributed to the user from the distributed computer systems using the selected local proxy identities; and
wherein, when the distributed resource-distribution system terminates use, by a user, of computational resources distributed by the distributed resource-distribution system to the user from a set of one or more distributed computer systems, the distributed reverse federated identity-management system returns the local proxy identities selected for the user to the pools of local proxy identities for the one or more distributed computer systems.

20. The physical data-storage device of claim 17
wherein the distributed reverse federated identity-management system returns information about each local proxy identity selected or provisioned for a user of the distributed resource-distribution system to the distributed resource-distribution system; and
wherein the distributed resource-distribution system uses the returned information to establish access by the user to the computational resources allocated from the distributed computer systems within which the local proxy identities are provisioned.

\* \* \* \* \*